United States Patent
Taranta et al.

(10) Patent No.: US 10,785,973 B2
(45) Date of Patent: Sep. 29, 2020

(54) AQUEOUS PESTICIDE MICROEMULSION

(71) Applicants: BASF SE, Ludwigshafen (DE); Maria Müller

(72) Inventors: Claude Taranta, Stutensee (DE); Steffen Schlehuber, Ruppertsberg (DE); Sarah Thompson, Mechanicsville, VA (US); Wolfgang Meier, Limburgerhof (DE); Jochen Schreieck, Schifferstadt (DE); Helmut Mueller, Weisenheim (DE); Paulo Cesar Queiroz, Sao Paulo (BR)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 15/506,886

(22) PCT Filed: Sep. 2, 2015

(86) PCT No.: PCT/EP2015/070039
§ 371 (c)(1),
(2) Date: Feb. 27, 2017

(87) PCT Pub. No.: WO2016/034618
PCT Pub. Date: Mar. 10, 2016

(65) Prior Publication Data
US 2017/0280710 A1    Oct. 5, 2017

Related U.S. Application Data

(60) Provisional application No. 62/044,464, filed on Sep. 2, 2014.

(51) Int. Cl.
| | | |
|---|---|---|
| *A01N 25/04* | (2006.01) | |
| *A01N 47/24* | (2006.01) | |
| *A01N 25/02* | (2006.01) | |
| *A01N 47/02* | (2006.01) | |
| *A01N 25/30* | (2006.01) | |
| *A01N 31/02* | (2006.01) | |
| *A01N 43/36* | (2006.01) | |
| *A01N 43/56* | (2006.01) | |
| *A01N 43/653* | (2006.01) | |

(52) U.S. Cl.
CPC ............. *A01N 25/04* (2013.01); *A01N 25/02* (2013.01); *A01N 25/30* (2013.01); *A01N 31/02* (2013.01); *A01N 43/36* (2013.01); *A01N 43/56* (2013.01); *A01N 43/653* (2013.01); *A01N 47/02* (2013.01); *A01N 47/24* (2013.01)

(58) Field of Classification Search
None
See application file for complete search history.

(56) References Cited

U.S. PATENT DOCUMENTS

| | | |
|---|---|---|
| 2007/0254951 A1 | 11/2007 | Cottrell et al. |
| 2011/0195839 A1 | 8/2011 | Schlotterbeck et al. |
| 2011/0195846 A1 | 8/2011 | Troppmann et al. |
| 2012/0053221 A1* | 3/2012 | Ishaque .................. A01N 25/30 514/407 |
| 2013/0085066 A1* | 4/2013 | Tavares-Rodrigues ..................... A01N 43/36 504/206 |

FOREIGN PATENT DOCUMENTS

| | | | |
|---|---|---|---|
| WO | WO-2005074685 A1 * | 8/2005 | ............ A01N 25/02 |
| WO | 2007/028538 A2 | 3/2007 | |
| WO | 2008/071801 A1 | 6/2008 | |
| WO | 2009/019299 A2 | 2/2009 | |
| WO | 2009/133166 A2 | 11/2009 | |
| WO | 2010/040834 A2 | 4/2010 | |
| WO | 2010/040835 A2 | 4/2010 | |
| WO | 2010/130599 A1 | 11/2010 | |
| WO | 2010/130680 A2 | 11/2010 | |

OTHER PUBLICATIONS

International Search Report issued in PCT/EP2015/070039 dated Nov. 2, 2015.
Written Opinion issued in PCT/EP2015/070039 dated Mar. 10, 2016.

* cited by examiner

*Primary Examiner* — Abigail Vanhorn
(74) *Attorney, Agent, or Firm* — Armstrong Teasdale LLP

(57) ABSTRACT

The present invention relates to an aqueous pesticide microemulsion formulation including (a) at least one organic pesticide compound P, which is sparingly soluble in water and which is present in the formulation in dissolved form; (b) at least one organic solvent LM1 selected from C1-C4-alkyl lactates; (c) at least one organic solvent LM2 selected from C5-C12-alkyl lactates; (d) at least one organic solvent LM3 selected from N—(C4-C12 alkyl)pyrrolidones; (e) at least one surfactant S selected from anionic surfactants and non-ionic surfactants and mixtures thereof; and (f) water.

13 Claims, No Drawings

AQUEOUS PESTICIDE MICROEMULSION

CROSS-REFERENCE TO RELATED APPLICATIONS

This application is a U.S. National Phase Application of PCT/EP2015/070039, filed Sep. 2, 2015, which claims the benefit of priority to U.S. 62/044,464, filed Sep. 2, 2014, the contents of which are hereby expressly incorporated by reference in their entirety.

The present invention relates to aqueous pesticide microemulsion formulation comprising at least one organic pesticide compound which is sparingly soluble in water.

BACKGROUND OF INVENTION

Organic pesticide compounds are often applied in the form of a dilute aqueous composition in order to achieve a good interaction with the target organisms. However, most organic pesticide compounds are only sparingly or even insoluble in water. Therefore, formulators are often confronted with difficulties in formulating pesticide compounds in aqueous formulations that can be easily diluted with water.

Organic pesticides having a limited solubility in water are often formulated as wettable powders or granules, as emulsifiable concentrates (EC) or as aqueous suspension concentrates (SC) which can be diluted with water for use in the field.

Suspension concentrates are formulations, wherein the active ingredient is present in the form of finely divided solid particles which are suspended in an aqueous dispersing medium utilizing surface-active compounds (surfactants), such as wetting agents, dispersants and rheological or suspending aids for stabilising the active ingredient particles in the dispersing medium. However, problems are often encountered with SC's as a result of settling during prolonged storage or storage at elevated temperatures, the resistance of settled particles to re-suspension and the formation of crystalline material upon storage. As a consequence, the formulations are difficult to handle and the bioefficacy may be inconsistent which is in particular problematic for highly active modern pesticides such as phenyl pyrazole pesticides or pyrethroids. Moreover, SC's are limited to actives that have a relatively high melting point. Most agrochemicals are sparingly water-soluble and become partly "deactivated" with water when formulated as an aqueous SC.

In wettable powders or granules the pesticide compound is present in the form of particles. When wettable powders or granules are diluted in water for field application, the particles of the powder or granules have to disintegrate in water to achieve a uniform distribution of the pesticide compound in the aqueous dilution. Unfortunately, disintegration of the particles is often hampered, if the solid formulation has been stored for prolonged time or in opened packages. Hindered disintegration may result in inconsistent bioefficacy.

Emulsifyable concentrates are non-aqueous liquid formulations, where the pesticide compound is dissolved in a mixture of non-polar organic solvents and emulsifiers. Upon dilution of emulsifiable concentrates with water, an oil-in-water emulsion is formed. Unfortunately, emulsifiable concentrates tend to be instable upon storage, as the surfactants and the solvents may suffer phase separation. As a result, emulsification in water may be hampered which may again result in inconsistent bioefficacy. Apart from that, the large amounts of non-polar solvents may be undesirable from hygiene, environmental safety and health protection at workplace.

Aqueous multiphase formulations, wherein the pesticide compound is dissolved in an organic phase, such as microemulsions, principally circumvent some of the aforementioned disadvantages. Microemulsions are multiphase systems which may comprise a disperse phase and a continuous phase or which may have bicontinuous structures with intricate channels of oily and aqueous phases. Due to the small particle size (droplet size) of the disperse phase, or the intricate channels, microemulsions have a translucent appearance. In contrast to macro emulsions, the average distance of adjacent phase boundaries, e.g. the droplet size of the disperse phase or the diameter of the channels (Z=average diameter as determined by light scattering) is at least 5 times smaller than in macro emulsions and generally does not exceed 200 nm, while the average diameter of the droplets in macro emulsions is in µm range.

Microemulsion formulations, also termed ME formulations, of organic pesticide compounds are water based and besides water, contain at least one organic solvent of limited water solubility, in particular a hydrocarbon solvent and at least one surfactant. By using ME formulations risks such as inflammability and toxicity, environmental concerns and costs are reduced in comparison with emulsifiable concentrate (EC) techniques, because water replaces a significant portion of the organic solvent. Due to the small size of phase domains ME formulations they can be diluted with water very easily and spontaneous formation of a very fine distribution of the organic constituents of the formulations in the aqueous phase can sometimes be achieved. However, it is difficult to achieve good storage stability of ME formulations of some pesticide compounds with respect to homogeneity of the formulation and crystallization of active ingredient may occur. Moreover, it may be difficult to achieve good dilution stability and formation of a nanodisperse distribution of the organic phase and also to achieve droplet size stability of the aqueous dilution. However, a stable droplet size after dilution, i.e. maintaining a small droplet size, is important to achieve consistent biological activities. Therefore, much effort is necessary in order to develop stable water-based microemulsion formulations of pesticide compounds.

WO 2009/019299 describes ME formulations of sparingly water soluble insecticide compounds, which, besides water and the insecticide compound, at least one polar organic solvent selected from ketones, esters, amides and ethers, each having from 6 to 8 carbon atoms, at least one alcohol having 6 to 8 carbon atoms, a water immiscible solvent and one ore more surfactants.

WO 2009/133166 describes ME formulations of pesticide compounds which, besides water and the pesticide, contain at least one organic solvent which is completely miscible with water, at least one organic solvent which is partially miscible with water, in particular a fatty acid amide and at least one non-ionic surfactant which usually includes at least two different surfactants having a poly-$C_2$-$C_4$-alkylene ether group.

WO 2010/040834 describes ME formulations which, besides the pesticide compound and water, contain at least one organic solvent miscible with a water solubility, at least one cosolvent which is only partially miscible with water, at least one organic solvent which is sparingly soluble or even insoluble in water, at least one anionic surfactant and at least one non-ionic surfactant. While this formulation type is particularly suitable for formulating certain fungicide compounds, it is not particularly useful for formulating phenyl pyrazole or pyrethroid insecticides. Similar formulations are known from WO 2010/040835 which contains pyraclostrobin as active ingredient.

WO 2007/028538 describes the use of alkyl lactates, in particular 2-ethylhexyl lactate, as an additive for improving bioefficacy of pesticides. WO 2007/028538 does not describe ME formulations.

Unfortunately, the stability of the ME formulations of prior art are not always satisfactory and demixing or crystallization of the pesticide may occur. Moreover, dilution stability of ME formulations is sometimes insufficient, i.e. the sparingly water-soluble pesticide ingredient tends to segregate upon or after dilution with water, in particular, when the formulation is highly loaded with the pesticide ingredient. Another problem is that some solvents or solvent combinations excerpt repellent activity against insect which cause problems if the formulation is intended for formulating insecticide compounds, in particular those which have a delayed action. A further problem is that certain types of solvents which provide stable ME formulations, may be problematic in view environmental requirements and working hygiene. Moreover, some of these solvents have the potential to cause irritation of the skin or eyes.

SUMMARY OF INVENTION

It was surprisingly found that the problems associate with prior art formulations of pesticide compounds can be overcome by using a mixture of organic solvents comprising:
- at least one organic solvent LM1 which is selected from $C_2$-$C_4$-alkyl lactates;
- at least one organic solvent LM2 which is selected from $C_5$-$C_{12}$-alkyl lactates;
- at least one organic solvent LM3 which is selected from N—($C_4$-$C_{12}$-alkyl)-pyrrolidones.

Therefore, a first aspect of the invention relates to a mixture of organic solvents comprising at least one organic solvent LM1 as defined herein, at least on organic solvent LM2 as defined herein and at least one organic solvent LM3 as defined herein for preparing an aqueous microemulsion formulation of an organic pesticide compound which is sparingly soluble in water.

A second aspect of the invention relates to an aqueous pesticide microemulsion formulation, comprising
a) at least one organic pesticide compound P, which is sparingly soluble in water and which is present in the formulation in dissolved form;
b) at least one organic solvent LM1 which is selected from $C_1$-$C_4$-alkyl lactates;
c) at least one organic solvent LM2 which is selected from $C_5$-$C_{12}$-alkyl lactates;
d) at least one organic solvent LM3 which is selected from N—($C_4$-$C_{12}$-alkyl)-pyrrolidones;
e) at least one surfactant S selected from anionic surfactants and non-ionic surfactants and mixtures thereof; and
f) water, which is preferably present in amounts of at least 5% by weight, in particular at least 10% by weight, e.g. from 5 to 50% by weight, in particular from 10 to 40% by weight, based on the total weight of the formulation.

A third aspect of the invention relates to the use of a solvent mixture as described herein which comprises
at least one organic solvent LM1 which is selected from $C_2$-$C_4$-alkyl lactates;
at least one organic solvent LM2 which is selected from $C_5$-$C_{12}$-alkyl lactates;
at least one organic solvent LM3 which is selected from N—($C_4$-$C_{12}$-alkyl)-pyrrolidones;
for preparing an aqueous microemulsion formulation of an organic pesticide compound which is sparingly soluble in water.

A fourth aspect of the invention relates to the use of a formulation as described herein for combating plant damaging pests, for plant protection or seed protection or for protection of non-living material against attack or infestation by plant damaging pests. A fifth aspect of the invention relates to a method of combating plant damaging pests, such as plant damaging insects, plant damaging fungi or plant damaging vegetatuibm which comprises contacting said plant damaging pests, their habitat, breeding ground, food supply, plant, seed, soil, area, material or environment in which said plant damaging pests are growing or may grow, or the materials, plants, seeds, soils, surfaces or spaces to be protected from attack or infestation by said pests with an effective amount of a formulation as described herein.

The aqueous pesticide formulations of the present invention are optically clear or translucent formulations which are virtually homogeneous. They are stable both with regard to phase separation and chemical degradation of the pesticide compounds, even after storage at elevated temperature, after storage at low temperature or after storage at changing temperatures. The formulations of the present invention remain liquid even at low temperatures of −10° C. and provide good storage stability at elevated temperature both with regard to physical stability and chemical stability of the ingredients. Moreover, the solvents contained therein do not have the potential to cause irritancy of the eyes or skin.

The formulations of the present invention can be easily diluted with water, thereby forming a bluish or even clear emulsion, indicating that the droplets/particles dispersed therein are of very small size. The average particle diameter of the droplets/particles will usually not exceed 1000 nm, in particular 500 nm. The small particle/size is maintained even after storage for a prolonged period of time, e.g. after storage for 24 h at room temperature the increase in particle size is generally less than 10%. The average particle size as referred herein, are Z-average particle diameters which can be determined by dynamic light scattering. A skilled person is familiar with these methods which are e.g. described in H. Wiese (D. Distler, Ed.), Aqueous Polymer Dispersions (Wässrige Polymerdispersionen), Wiley-VCH 1999, Chapter 4.2.1, p. 40ff, and the literature cited therein; H. Auweter, D. Horn, J. Colloid Interf. Sci. 105 (1985), p. 399; D. Lilge, D. Horn, Colloid Polym. Sci. 269 (1991), p. 704; and H. Wiese, D. Horn, J. Chem. Phys. 94 (1991), p. 6429.

DETAILED DESCRIPTION OF INVENTION

A skilled person will readily appreciate that any statements regarding the first and second aspect of the invention likewise apply to the third, fourth and fifth aspect of the present invention.

Solubility in water, as referred herein, relates to the solubility of the pure compound in deionized water at 20° C., 1.016 bar and pH 6-7.

Here and in the following, the prefix $C_n$-$C_m$ indicates the number of carbon atoms a radical or a compound might have. E.g. $C_1$-$C_4$ indicates a group of radicals or compounds having 1, 2, 3 or 4 carbon atoms.

For example, $C_n$-$C_m$ alkyl indicates a group of alkyl radicals, i.e. saturated aliphatic radicals, which are linear or branched and having n to m carbon atoms. Examples include $C_1$-$C_4$-alkyl, i.e. alkyl having 1, 2, 3 or 4 carbon atoms such as methyl, ethyl, n-propyl, isopropyl, n-butyl, 2-butyl, 2-methylpropyl or 1,1-dimethylethyl (=tert.-butyl); or $C_5$-$C_{12}$-alkyl i.e. alkyl having 5, 6, 7, 8, 9, 10, 11 or 12 carbon atoms such as n-pentyl, 2-pentyl, 2-methylbutyl, 2,2-di methyl propyl, n-hexyl, 2-hexyl, 2-methylpentyl, n-heptyl, 2-heptyl, 2-methylhexyl, n-octyl, 2-octyl, 2-methylheptyl, 2-ethylhexyl, n-nonyl, 2-nonyl, 2-methyloctyl, 1,3,5-trimethylhexyl, n-decyl, 2-decyl, 2-propylheptyl, undecyl, 1-methyldecyl, 2-methyldecyl, n-dodecyl, 2,4,6-trimethylnonyl, 1,3,5,7-tetramethyloctyl etc. The term $C_4$-$C_{12}$ alkyl refers to the group of alkyl radicals having 4 to 12 carbon atoms.

The formulation of the present invention contains at least one organic pesticide compound, which is sparingly soluble in water. Sparingly soluble means that the solubility of the pesticide compound in deionized water at 20° C. and 1 bar is at most 1 g/L, in particular at most 0.5 g/L, especially at most 0.1 g/L.

Particularly suitable are organic pesticide compounds which are soluble in the solvent mixture in an amount of at least 10 g/l, in particular at least 20 g/l and more preferably at least 50 g/l (at 20° C. and 1 bar). Preferred organic pesticide compounds have a defined molecular structure, i.e. they can be described by one structural formula, including diastereomers, diastereomeric mixtures, enantiomers, enantiomeric mixtures or tautomers or mixtures of tautomers. The molecular weight of pesticide compounds will usually range from 100 to 600 dalton.

The pesticide compound can be selected from each group of active ingredients which are used to protect plants/crops/materials/non-human animals from attack or infestation by harmful organisms, i.e. the pesticide compound can be selected from acaricides, antifeedants, avicides, algicides, bactericides, bird repellents, chemosterilants, fungicides, herbicides, herbicide safeners, insect attractants, insect repellents, insecticides, mammal repellents, mating disrupters, molluscicides, nematicides, plant activators, plant growth regulators, rhodenticides, synergists, virucides and other compounds with exert an action on the organisms/materials to be protected and/or against the harmful organism. Mixtures of pesticides of two or more of the abovementioned classes may also be used. The skilled worker is familiar with such pesticides which can be found, for example, in the Pesticide Manual, 16th Ed. (2013), The British Crop Protection Council, London. Preference is given to formulations containing one or more pesticides selected from the groups of fungicides and insecticides and mixtures of one or more insecticide with one or more fungicides.

Suitable insecticides are e.g. insecticides from the class of the carbamates, organophosphates, organochlorine insecticides, phenylpyrazoles, pyrethroids, neonicotinoids, spinosins, avermectins, milbemycins, juvenile hormone analogs, alkyl halides, organotin compounds nereistoxin analogs, benzoylureas, diacylhydrazines, METI acarizides, and insecticides such as chloropicrin, pymetrozin, flonicamid, clofentezin, hexythiazox, etoxazole, diafenthiuron, propargite, tetradifon, chlorfenapyr, DNOC, buprofezine, cyromazine, amitraz, hydramethylnon, acequinocyl, fluacrypyrim, rotenone, or their derivatives.

Suitable fungicides are e.g. fungicides from the classes of dinitroanilines, allylamines, anilinopyrimidines, antibiotics, aromatic hydrocarbons, benzenesulfonamides, benzimidazoles, benzisothiazoles, benzophenones, benzothiadiazoles, benzotriazines, benzyl carbamates, carbamates, carboxamides, carboxylic acid diamides, chloronitriles cyanoacetamide oximes, cyanoimidazoles, cyclopropanecarboxamides, dicarboximides, dihydrodioxazines, dinitrophenyl crotonates, dithiocarbamates, dithiolanes, ethylphosphonates, ethylaminothiazolecarboxamides, guanidines, hydroxy-(2-amino)pyrimidines, hydroxyanilides, imidazoles, imidazolinones, inorganic substances, isobenzofuranones, methoxyacrylates, methoxycarbamates, morpholines, N-phenylcarbamates, oxazolidinediones, oximinoacetates, oximinoacetamides, peptidylpyrimidine nucleosides, phenylacetamides, phenylamides, phenylpyrroles, phenylureas, phosphonates, phosphorothiolates, phthalamic acids, phthalimides, piperazines, piperidines, propionamides, pyridazinones, pyridines, pyridinylmethylbenzamides, pyrimidinamines, pyrimidines, pyrimidinonehydrazones, pyrroloquinolinones, quinazolinones, quinolines, quinones, sulfamides, sulfamoyltriazoles, thiazolecarboxamides, thiocarbamates, thiophanates, thiophenecarboxamides, toluamides, triphenyltin compounds, triazines, triazoles.

Suitable herbicides are e.g. herbicides from the classes of the acetamides, amides, aryloxyphenoxypropionates, benzamides, benzofuran, benzoic acids, benzothiadiazinones, bipyridylium, carbamates, chloroacetamides, chlorocarboxylic acids, cyclohexanediones, dinitroanilines, dinitrophenol, diphenyl ether, glycines, imidazolinones, isoxazoles, isoxazolidinones, nitriles, N-phenylphthalimides, oxadiazoles, oxazolidinediones, oxyacetamides, phenoxycarboxylic acids, phenylcarbamates, phenylpyrazoles, phenylpyrazolines, phenylpyridazines, phosphinic acids, phosphoroamidates, phosphorodithioates, phthalamates, pyrazoles, pyridazinones, pyridines, pyridinecarboxylic acids, pyridinecarboxamides, pyrimidinediones, pyrimidinyl(thio)benzoates, quinolinecarboxylic acids, semicarbazones, sulfonylaminocarbonyltriazolinones, sulfonylureas, tetrazolinones, thiadiazoles, thiocarbamates, triazines, triazinones, triazoles, triazolinones, triazolocarboxamides, triazolopyrimidines, triketones, uracils and ureas.

In particular groups of embodiments, the pesticide compound is selected from the group consisting of:
phenylpyrazole insecticides, also termed fiproles;
pyrethroid compounds;
strobilurin fungicides;
triazole fungicides; and
anilide fungicides;
as well as mixtures thereof.

Phenylpyrazole insecticides are known to be ligand gated chloride channel antagonists well known—see Vincent L. Salgado et al. in "Modern Crop Protection Compounds", Volume 3, Chapter 29.5, p. 1048-1065 and literature cited therein. Fiproles include acetoprole, ethiprole, fipronil, flufiprole, pyrafluprole, pyriprole and vaniliprole. Preferably, the formulation contains fipronil, in particular fipronil as the sole phenylpyrazole insecticide.

Pyrethroids form a well known class of insecticide compounds. They include e.g. acrinathrin, allethrin, d-cis-trans allethrin, d-trans allethrin, bifenthrin, bioallethrin, bioallethrin S-cylclopentenyl, bioresmethrin, cycloprothrin, cyfluthrin, beta-cyfluthrin, cyhalothrin, lambda-cyhalothrin, gamma-cyhalothrin, cypermethrin, alpha-cypermethrin, beta-cypermethrin, theta-cypermethrin, zeta-cypermethrin, cyphenothrin, deltamethrin, empenthrin, esfenvalerate, etofenprox, fenpropathrin, fenvalerate, flucythrinate, flumethrin, tau-fluvalinate, halfenprox, imiprothrin, meperfluthrin, metofluthrin, momfluorothrin, permethrin, phenothrin, prallethrin, profluthrin, pyrethrin (pyrethrum), resmethrin, silafluofen, tefluthrin, tetramethylfluthrin, tetramethrin, tralomethrin and transfluthrin. Perffered pyrethroids for the purpose of the present invention are selected from cypermethrin, the cypermethrin stereoisomers alpha-cypermethrin, beta-cypermethrin, theta-cypermethrin and zeta-cypermethrin, deltamethrin, bifenthrin, cyfluthrin, lambda-cyhalothrin and permethrin. In particular, the pyrethroid is selected from the cypermethrin stereoisomers and especially alpha-cypermethrin.

Strobilurins form a well known class of fungicides—see H. Sauter in "Modern Crop Protection Compounds", Volume 2, Chapter 13.2, p. 457-495 and literature cited therein. Suitable strobilurins include but are not limited to kresoxim-methyl, azoxystrobin, coumoxystrobin, dimoxystrobin, enoxystrobin, fenamistrobin, flufenoxystrobin, fluoxastrobin, mandestrobin, metominostrobin, orysatrobin, picoxystrobin, pyraclostrobin, pyraoxystrobin, pyrametostrobin, trifloxystrobin, and triclopyricarb. In particular, the strobilurin fungicide is pyraclostrobin.

Triazole fungicides form a further well known class of fungicides—see Kuck et al. in "Modern Crop Protection Compounds", Volume 2, Chapter 17.2.2, p. 618-637 and literature cited therein. Triazole fungicides include but are not limited to bitertanol, bromuconazole, cyproconazole, difenoconazole, diniconazole, enilconazole, epoxiconazole, fenbuconazole, flusilazol, fluquinconazole, flutriafol, hexaconazole, imibenconazole, ipconazole, metconazole, myclobutanil, penconazole, propiconazole, prothioconazole, simeconazole, tebuconazole, tetraconazole, triadimenol, triadimefon, and triticonazole. In particular, the triazole fungicide is metconazole.

Carboxanilides form a further well known class of fungicides and include but are not limited to N-Biphenylamides, such as bixafen, boscalid, fluxapyroxad, N-(4'-bromobiphenyl-2-yl)-4-difluoromethyl-2-methylthiazol-5-carboxamide, N-(4'-trifluoromethylbiphenyl-2-yl)-4-difluoromethyl-2-methylthiazol-5-carboxamide, N-(4'-chloro-3'-flurobiphenyl-2-yl)-4-difluoromethyl-2-methylthiazol-5-carboxamide, N-(3',4'-dichloro-4-fluorobiphenyl-2-yl)-3-difluoromethyl-1-methylpyrazole-4-carboxamide and N-(3',4',5'-trifluorobiphenyl-2-yl)-3-difluoromethyl-1-methylpyrazole-4-carboxamide. In particular the carboxanilide is fluxapyroxad.

In a first group of embodiments, the formulation of the present invention comprises a phenylpyrazole insecticide, in particular fipronil. In addition to the phenylpyrazole insecticide, the formulations of this group of embodiments may contain one or more further pesticide compounds which are selected from strobilurins, in particular pyraclostrobin and pyrethroids and mixtures thereof, e.g. mixtures of two or more different strobilurins, mixtures of two or more different pyrethroids and mixtures of at least one strobilurin and at least one pyrethroid, e.g. a mixture of pyraclostrobin and alpha-cypermethrin.

In a first special group of embodiments, the formulation of the present invention contains fipronil as the sole pesticide ingredient.

In a second special group of embodiments, the formulation of the present invention contains fipronil and a strobilurin fungicide as sole pesticide ingredients. In this particular group of embodiments, the strobilurin fungicide is preferably pyraclostrobin. In this particular group of embodiments, the weight ratio of fipronil to strobilurin fungicide is preferably from 1:1000 to 1000:1, in particular from 1:100 to 100:1 and especially from 1:10 to 10:1.

In third special group of embodiment, the formulation of the present invention contains fipronil and a pyrethroid as sole pesticide ingredients. In this particular group of embodiments, the pyrethroid compound is preferably selected from cypermethrin, the cypermethrin stereoisomers alpha-cypermethrin, beta-cypermethrin, theta-cypermethrin and zeta-cypermethrin, deltamethrin, cyfluthrin, lambda-cyhalotrhin and permethrin. Especially, the formulation contains fipronil and alpha-cypermethrin. In this special group of embodiments, the weight ratio of fipronil to pyrethroid is preferably from 1:1000 to 1000:1, in particular from 1:100 to 100:1 and especially from 1:10 to 10:1.

In fourth special group of embodiments, the formulation of the present invention contains fipronil, a strobilurin fungicide and a pyrethroid insecticide as sole pesticide ingredients. In this special group of embodiments the strobilurin fungicide is preferably pyraclostrobin. In this special group of embodiments the pyrethroid compound is preferably selected from cypermethrin, the cypermethrin stereoisomers alpha-cypermethrin, beta-cypermethrin, theta-cypermethrin and zeta-cypermethrin, deltamethrin, cyfluthrin, lambda-cyhalotrhin and permethrin. Especially, the formulation contains fipronil, pyraclostrobin and alpha-cypermethrin. In this special group of embodiments the weight ratio of fipronil to strobilurin fungicide is preferably from 1:1000 to 1000:1, in particular from 1:100 to 100:1 and especially from 1:10 to 10:1. In this special group of embodiments the weight ratio of pyrethroid to strobilurin fungicide is preferably from 1:1000 to 1000:1, in particular from 1:100 to 100:1 and especially from 1:10 to 10:1.

In yet a further special group of embodiments, the formulation of the present invention contains a pyrethroid as the sole pesticide ingredient. In this particular group of embodiments, the pyrethroid compound is preferably selected from cypermethrin, the cypermethrin stereoisomers alpha-cypermethrin, beta-cypermethrin, theta-cypermethrin and zeta-cypermethrin, deltamethrin, cyfluthrin, lambda-cyhalotrhin and permethrin.

In yet a further special group of embodiments, the formulation of the present invention contains a strobilurin compound as the sole pesticide ingredient. In this particular group of embodiments, the strobilurin compound is preferably pyraclostrobin.

In yet a further special group of embodiments, the formulation of the present invention contains a triazole fungicide compound as the sole pesticide ingredient. In this particular group of embodiments, the triazole fungicide compound is preferably metconazole.

In yet a further special group of embodiments, the formulation of the present invention contains pyraclostrobin and a triazole compound as sole pesticide ingredients. In this particular group of embodiments, the triazole compound is preferably metconazole. In this special group of embodiments, the weight ratio of pyraclostrobin to triazole compound is preferably from 1:1000 to 1000:1, in particular from 1:100 to 100:1 and especially from 1:10 to 10:1.

In yet a further special group of embodiments, the formulation of the present invention contains pyraclostrobin and a carboxanilide fungicide compound as sole pesticide ingredients. In this particular group of embodiments, the carboxanilide fungicide compound is preferably fluxapyroxad. In this special group of embodiments, the weight ratio of pyraclostrobin to carboxanilide fungicide compound is preferably from 1:1000 to 1000:1, in particular from 1:100 to 100:1 and especially from 1:10 to 10:1.

The total concentration of pesticide compounds which are contained in the formulation is generally in the range from 1 to 30% by weight, in particular from 2 to 27% by weight, especially from 3 to 25% by weight, based on the total weight of the formulation.

The pesticide compounds are present in the formulation in essentially dissolved form, i.e. the formulation does not contain more than 5% by weight, in particular not more than 2% by weight, based on the total amount of pesticide compound(s) present in the formulation, of solid pesticide compound(s). In particular the formulation does not contain any solid pesticide compound(s), i.e. the pesticide compounds are completely dissolved.

The formulation of the present invention contains at least one solvent LM1 which is preferably selected from $C_2$-$C_4$-alkyl lactates, in particular from ethyl lactate, n-propyl lactate and isopropyl lactate. In particular the solvent LM1 is n-propyl lactate.

The concentration of the solvent LM1 is preferably 3 to 30% by weight, in particular 5 to 20% by weight and especially 7 to 15% by weight, based on the total weight of the formulation.

The formulation of the present invention contains at least one solvent LM2 which is preferably selected from $C_6$-$C_{10}$-alkyl lactates, such as n-hexyl lactate, 1-ethylhexyl lactate, 1-methylheptyl lactate, 1,3-dimethylhexyl lactate, 2-methylheptyl lactate, 2,4-dimethylhexyllactate, 2,2,4-trimethylpentyl lactate, n-octyl lactate, 2-ethylhexyl lactate, n-nonyl lactate, 1-methyloctyl lactate, 2-methyloctyl-lactate, 1-methylnonyl lactate, 2-propylheptyl lactate and n-decyl lactate, in particular from $C_6$-$C_8$-alkyl lactates, such as n-hexyl lactate, 1-ethylhexyl lactate, 1-methylheptyl lactate, 1,3-dimethylhexyl lactate, 2-methylheptyl lactate, 2,4-dimethylhexyllactate, 2,2,4-trimethylpentyl lactate, n-octyl lactate or 2-ethylhexyl lactate. In particular, the solvent LM1 is $C_8$-alkyl lactate, such as 1-ethylhexyl lactate, 1-methylheptyl lactate, 1,3-dimethylhexyl lactate, 2-methylheptyl lactate, 2,4-dimethylhexyllactate, 2,2,4-trimethylpentyl lactate, n-octyl lactate or 2-ethylhexyl lactate, especially 2-ethylhexyl lactate.

The concentration of the solvent LM2 is preferably 1 to 20% by weight, in particular 2 to 15% by weight and especially 2 to 10% by weight, based on the total weight of the formulation.

Preferably the mass ratio of the solvent LM1 to the solvent LM2 is in the range from 20:1 to 1:5, in particular form 10:1 to 1:1.

As a further component d) the formulation of the present invention contains a least one solvent LM3, which is preferably selected from the group of N—$C_6$-$C_{12}$-alkyl-2-pyrrolidones such as N-hexyl-2-pyrrolidone, N-(1-methylheptyl)-2-pyrrolidone, N-(n-octyl)-2-pyrrolidone, N-(2-ethylhexyl)-2-pyrrolidone, N-(n-decyl)-2-pyrrolidone and N-(dodecyl)-2-pyrrolidone. The solvent LM3 is in particular a N—($C_8$-alkyl)pyrrolidone, especially N-(n-octyl)-2-pyrrolidone.

The total concentration of solvent LM3 in the formulation of the present invention is preferably in the range of 5 to 50% by weight, in particular from 8 to 30% by weight and in particular from 10 to 20% by weight, based on the total weight of the formulation.

The total concentration of solvents LM2+LM3 in the formulation of the present invention is preferably in the range of 10 to 55% by weight, in particular from 15 to 45% by weight and especially from 20 to 40% by weight, based on the total weight of the formulation.

Preferably, the weight ratio of the total amount lactate esters, i.e. of solvent LM1+solvent LM2, to solvent LM3 is from 10:1 to 1:10.

The formulation of the present invention may contain one or more solvents which are completely water-miscible and which are selected from $C_1$-$C_4$-alkanols, glycerine and $C_2$-$C_6$-alkylene glycols. Suitable organic solvents LM4 include but are not limited to:

are ethylene glycol, 1,2-propylene glycol, 1,3-propylene glycol, 1,4-butandiol, 1,2-pentandiol, 1,5-pentandiol, 1,2-hexandiol, and 1,6-hexandiol;
ethanol, n-propanol, isopropanol, n-butanol, isobutanol, and tert.-butanol;
and mixtures thereof. Preferred solvents LM4 are $C_2$-$C_4$-alkylene glycols.

The concentration of the solvent LM4, if present, is preferably 1 to 30% by weight, in particular 5 to 25% by weight and especially 10 to 20% by weight, based on the total weight of the formulation.

Besides the solvents LM1, LM2, LM3 and the optional solvents LM4, the formulation of the invention may contain other organic solvents different from the aforementioned organic solvents. Preferably, the total amount of organic solvent which is different from the organic solvents LM1, LM2, LM3 and the optional solvents LM4, does not exceed 10% by weight, in particular 5% by weight of the total amount of solvents LM1, LM2, LM3 and the optional solvents LM4 contained in the formulation.

As a further component e), the formulation of the present invention contains at least one, e.g. 1, 2, 3 or 4, surfactants. Preferably the surfactants are selected from non-ionic surfactants and anionic surfactants.

The total concentration of surfactant in the formulation of the present invention is preferably in the range of 5 to 40% by weight, in particular from 7 to 35% by weight and especially from 10 to 30% by weight, based on the total weight of the formulation.

In particular, component e) comprises at least one non-ionic surfactant and optionally comprises one or more, e.g. 1, 2 or 3 anionic surfactants.

Non-ionic surfactants include in particular
homo- or copolymers of $C_2$-$C_3$-alkyleneoxides, in particular EO homopolymers, PO homopolymers or EO/PO copolymers;
poly(oxy-$C_2$-$C_3$-alkylene) $C_8$-$C_{22}$-alkyl ether, in particular polyethoxylates and poly-ethoxylates-co-propoxylates of linear or branched $C_8$-$C_{22}$-alkanols, more preferably polyethoxylated fatty alcohols and polyethoxylated oxoalcohols, such as polyethoxylated lauryl alcohol, polyethoxylated isotridecanol, polyethoxylated cetyl alcohol, polyethoxylated stearyl alcohol, and esters thereof, such as acetates;
polyoxy-$C_2$-$C_3$-alkylene aryl ethers and polyoxy-$C_2$-$C_3$-alkylene $C_1$-$C_{16}$-alkylaryl ethers, such as poly(oxy-$C_2$-$C_3$-alkylene) $C_1$-$C_{16}$-alkylbenzene ethers, in particular polyethoxylates of $C_1$-$C_{16}$-alkylphenoles, such as polyethoxylates of nonylphenol, decylphenol, isodecylphenol, dodecylphenol or isotridecylphenol,
poly(oxy-$C_2$-$C_3$-alkylene) mono-, di- or tristyryl phenyl ethers, in particular polyethoxylates of mono-, di- and tristyrylphenoles; and the formaldehyde condensates thereof and the esters thereof, e.g. the acetates;
$C_6$-$C_{22}$-alkylglucosides and $C_6$-$C_{22}$-alkyl polyglucosides;
polyethoxylates of $C_6$-$C_{22}$-alkylglucosides and polyethoxylates of $C_6$-$C_{22}$-alkyl polyglucosides;
polyethoxylates of fatty amines;
polyethoxylates of fatty acids and polyethoxylates of hydroxyl fatty acids;
partial esters of polyols with $C_6$-$C_{22}$-alkanoic acids, in particular mono- and diesters of glycerine and mono-, di- and triesters of sorbitan, such as glycerine monostearate, sorbitanmonooleat, sorbitantristearat;
polyethoxylates of partial esters of polyols with $C_6$-$C_{22}$-alkanoic acids, in particular polyethoxylates of mono- and diesters of glycerine and polyethoxylates of mono-, di- and triesters of sorbitan, such as polyethoxylates of glycerine monostearate, polyethoxylates of sorbitan-monooleat, polyethoxylates of sorbitanmonostearat and polyethoxylates of sorbitantristearat;

polyethoxylates of vegetable oils or animal fats, such as corn oil ethoxylate, castor oil ethoxylate, tallow oil ethoxylate;

acetylene glycols, such as 2,4,7,9-tetramethyl-4,7-bis(hydroxy)-5-decyne;

polyoxyethylene-polyoxypropylene-blockcopolymers; and polyethoxylates of fatty amines, fatty amides or of fatty acid diethanolamides.

The term poly(oxy-$C_2$-$C_3$-alkylene) ether refers to polyether radicals derived from ethylene oxide and/or propylene oxide. The term polyethoxylate refers to a polyether radical derived from ethylene oxide. Likewise, the term polyoxyethylene-co-polyoxypropylene refers to a polyether radical derived from a mixture of ethylene oxide and propylene oxide. The average number of repeating units in the polyether radicals will generally vary from 2 to 100, frequently from 3 to 100 and in particular from 3 to 50 or from 3 to 30.

Preferably, the non-ionic surfactant is selected from the group consisting of homo- or copolymers of $C_2$-$C_3$-alkylene oxides, poly(oxy-$C_2$-$C_3$-alkylene) $C_8$-$C_{22}$-alkyl ethers, poly(oxy-$C_2$-$C_3$-alkylene) $C_1$-$C_{16}$-alkylbenzene ethers, poly(oxy-$C_2$-$C_3$-alkylene) mono-, di- or tristyryl phenyl ethers, poly(oxy-$C_2$-$C_3$-alkylene) mono- or distyryl phenyl ether-formaldehyde condensates, and mixtures thereof.

In a particular group of embodiments, the formulation of the present invention comprises at least one non-ionic surfactant, which is selected from the group consisting of poly(oxyethylene) $C_8$-$C_{22}$-alkyl ethers and poly(oxyethylene) di- or tristyryl phenyl ethers, and mixtures thereof, where the poly(oxyethylene) groups preferably have from 3 to 30 oxyethylene repeating units.

Especially, the non-ionic surfactant is selected from the group consisting of poly(oxyethylene) $C_8$-$C_{22}$-alkyl ethers and poly(oxyethylene) di- or tristyryl phenyl ethers, and mixtures thereof, where the poly(oxyethylene) groups have from 3 to 30 oxlethylene repeating units.

Anionic surfactants include the free acids and the salts, in particular the sodium, potassium, calcium or ammonium salts of $C_6$-$C_{22}$-alkylsulfonates such as lauryl sulfonate, isotridecylsulfonate;

$C_6$-$C_{22}$-alkylsulfates such as lauryl sulfate, isotridecylsulfate, cetylsulfate and stearylsulfate;

arylsulfonates, in particular $C_1$-$C_{16}$-alkylbenzene sulfonates, such as cumylsulfonate, octylbenzene sulfonate, nonylbenzene sulfonate, and dodecylbenzene sulfonate, naphthylsulfonate, mono- and di-$C_1$-$C_{16}$-alkylnaphthyl sulfonates such as dibutylnaphthylsulfonate;

mono- and di-$C_1$-$C_{16}$-alkyldiphenylether (di)sulfonates, such as dodecyldiphenylether disulfonate;

sulfates and sulfonates of fatty acids and fatty acid esters;

poly(oxy-$C_2$-$C_3$-alkylene) $C_8$-$C_{22}$-alkyl ether sulfates, in particular sulfates of ethoxylated $C_8$-$C_{22}$ alkanols, such as sulfates of ethoxylated lauryl alcohol;

poly(oxy-$C_2$-$C_3$-alkylene) $C_1$-$C_{16}$-alkylbenzene ether sulfates, in particular sulfates of ethoxylated $C_1$-$C_{16}$-alkylphenols;

di $C_4$-$C_{18}$ alkyl esters of sulfosuccinic acid (=$C_4$-$C_{18}$-dialkyl sulfosuccinates), such as dioctylsulfosuccinate;

condensates of naphthalinesulfonic acid, $C_1$-$C_{16}$-alkyl naphthalinesulfonic acid or phenolsulfonic acid with formaldehyde (=($C_1$-$C_{16}$-alkyl) naphthalene sulfonate-formaldehyde condensates and phenolsulfonate formaldehyde condensates);

lignosulfonates, i.e. salts of lignin sulfonic acid;

poly(oxy-$C_2$-$C_3$-alkylene) mono-, di- or tristyryl phenyl ether sulfates, in particular polyethoxylates of mono-, di- or tristyrylphenol;

mono- and di-$C_8$-$C_{22}$-alkyl sulfates;

poly(oxy-$C_2$-$C_3$-alkylene) $C_8$-$C_{22}$-alkyl ether phosphates;

poly(oxy-$C_2$-$C_3$-alkylene) $C_1$-$C_{16}$-alkylbenzene ether phosphates;

poly(oxy-$C_2$-$C_3$-alkylene) mono- di- or tristyryl phenyl etherphosphates;

polyoxyethylene polycarboxylates, in particular homo- and copolymers of monoethylenically unsaturated mono- or dicarboxylic acids having from 3 to 8 carbon atoms, the copolymers also having polyethylene oxide side chains;

salts of fatty acids, such as stearates; and polyphosphates, such as hexametaphosphates and triphosphates (=tripoly-phosphate).

In particular, the anionic surfactant is selected from the group consisting of the salts of $C_1$-$C_{16}$-alkyl benzene sulfonates, $C_1$-$C_{16}$-alkyl naphthalene sulfonates, lignosulfonates, naphthalene sulfonate-formaldehyde condensates, $C_1$-$C_{16}$-alkyl naphthalene sulfonate-formaldehyde condensates, poly(oxy-$C_2$-$C_3$-alkylene) $C_8$-$C_{22}$-alkyl ether sulfates, poly(oxy-$C_2$-$C_3$-alkylene) $C_8$-$C_{22}$-alkyl ether phosphates, poly(oxy-$C_2$-$C_3$-alkylene) $C_1$-$C_{16}$-alkylbenzene ether sulfates, poly(oxy-$C_2$-$C_3$-alkylene) $C_1$-$C_{16}$-alkylbenzene ether phosphates, $C_8$-$C_{22}$-alkyl sulfates, $C_4$-$C_{18}$-dialkyl sulfosuccinates, poly(oxy-$C_2$-$C_3$-alkylene) mono-, di- or tristyryl phenyl ether sulfates, poly(oxy-$C_2$-$C_3$-alkylene) mono-, di- or tristyryl phenyl etherphosphates, polyoxyethylene polycarboxylates, and mixtures thereof.

In a particular group of embodiments, the formulation of the present invention comprises at least one anionic surfactant, which is selected from the group consisting of the salts of poly(oxy-$C_2$-$C_3$-alkylene)di- or tristyryl phenyl ether sulfates.

Especially, the anionic surfactant is selected from the group consisting of is selected from the group consisting of the salts of poly(oxy-$C_2$-$C_3$-alkylene) di- or tristyryl phenyl ether sulfates.

In a particular group of embodiments, component e) comprises at least 95, % by weight, based on the total amount of component e) and especially exclusively one or more non-ionic surfactants. In this particular group of embodiments, the formulation preferably comprises at least one non-ionic surfactant which is selected from the group consisting of poly(oxyethylene) $C_8$-$C_{22}$-alkyl ethers and poly(oxyethylene) di- or tristyryl phenyl ethers, and mixtures thereof, where the poly(oxyethylene) groups preferably have from 3 to 30 oxyethylene repeating units. In this particular group of embodiments, the is in particular selected from the group consisting of poly(oxyethylene) $C_8$-$C_{22}$-alkyl ethers and poly(oxyethylene) di- or tristyryl phenyl ethers, and mixtures thereof, where the poly(oxyethylene) groups preferably have from 3 to 30 oxyethylene repeating units.

In another particular group of embodiments, component e) comprises at least 95% by weight, based on the total amount of component e) and especially exclusively a mixture of at least one non-ionic surfactant and at least one anionic surfactant. In this particular group of embodiments, the weight ratio of non-ionic surfactant to anionic surfactant is in particular in the range from 10:1 to 1:5.

In a special group of embodiments, the formulation of the present invention comprises at least one anionic surfactant which is selected from the group consisting of the salts of poly(oxy-$C_2$-$C_3$-alkylene)di- or tristyryl phenyl ether sulfates and at least one non-ionic surfactant which is in particular selected from the group consisting of poly(oxyethylene) $C_8$-$C_{22}$-alkyl ethers. In this particular group of embodiments, the weight ratio of non-ionic surfactant to anionic surfactant is in particular in the range from 10:1 to 1:5.

In another special group of embodiments, the formulation of the present invention comprises at least one first non-ionic surfactant which is selected from the group consisting of poly(oxyethylene) $C_8$-$C_{22}$-alkyl ethers and at least one second non-ionic surfactant which is selected from the group consisting of poly(oxyethylene) di- or tristyryl phenyl ethers.

The composition of the present invention further comprises water. The amount of water is preferably in the range from 5 to 50% by weight, in particular from 10 to 40% by weight, based on the total weight of the formulation.

The formulation of the present invention may contain a hyperbranched, oxygen containing aliphatic polymer P.

In context with hyperbranched, oxygen containing aliphatic polymers the term "aliphatic" indicates that the polymer is predominately constructed of acylic or cylic aliphatic moieties and does not contain aromatic moieties.

In context with hyperbranched, oxygen containing aliphatic polymers, the term "oxygen containing" indicates that the polymer contains a plurality of oxygen atoms.

In context with hyperbranched, oxygen containing aliphatic polymers, the term "hyperbranched" indicates that the polymer has strongly branched structure within the polymer chain. Hyperbranched polymers are generally characterized by a high degree of branching (DB) which is generally at least 5%, in particular at least 10%, more particularly at least 20% and especially at least 30% and which may be as high as 100%. For the general definition of hyperbranched polymers, reference is also made to P. J. Flory, J. Am. Chem. Soc. 1952, 74, 2718, and H. Frey et al., Chem. Eur. J. 2000, 6, No. 14, 2499. The degree of branching, DB, is defined by the following formula:

$$DB\ (\%) = (T+Z)/(T+Z+L) \times 100,$$

where
T is the average number of terminally attached monomer units,
Z is the average number of branch-forming monomer units,
L is the average number of linearly attached monomer units.

For a definition of the degree of branching, DB see also H. Frey et al. Acta Polym. 1997, 48, 30.

Dendrimers are a specific group of hyperbranched polymers which generally have a degree of branching DB of at least 95%, especially 99% to 100%. For the purpose of the invention hyperbranched polymers are preferred, which have a degree of branching DB of 10% to 95%, in particular of 20% to 90%, and more particularly of 30% to 80%.

Preferred hyperbranched, oxygen containing aliphatic polymers have a weight-average molecular weight $M_w$ in the range from about 1500 to 500 000, in particular from about 2000 to 200 000, more particularly 3000 to 100 000. The molar mass can be determined by gel permeation chromatography with a standard, such as polymethyl methacrylate. Preferred hyperbranched, oxygen containing aliphatic polymers have a number-average molecular weight $M_n$ in the range from about 1000 to 300 000, in particular from about 1200 to 100 000, more particularly 1500 to 50 000. The molar mass can be determined by gel permeation chromatography with a standard, such as polymethyl methacrylate. The polydispersity, i.e. the ratio Mw/Mn is preferably in the range from 1.3 to 10, in particular from 1.5 to 6.

Preference is given to non-ionic hyperbranched, oxygen containing aliphatic polymers, i.e. polymers, which neither contain cationic groups, such as quaternary ammonium or phosphonium groups or sulfonium groups, nor anionic groups or acidic groups which dissociate in water to form anionic groups, such as COOH, $SO_3H$ or $P(O)OH2$, and the corresponding anionic functional groups, respectively.

The concentration of hyperbranched, oxygen containing aliphatic polymers in the formulation of the present invention, if present, is generally in the range from 2 to 25% by weight, in particular from 3 to 20% by weight and especially from 5 to 15% by weight, based on the total weight of the formulation. However, the hyperbranched polymer may also be absent.

Preferably, the weight ratio of the at least one pesticide compound to the at least one hyperbranched aliphatic polymer P, if present, is in the range from 1:5 to 2:1, in particular in the range from 1:3 to 1.5:1, especially in the range form 1:2 to 1.2:1. Hyperbranched aliphatic oxygen containing polymers P are known, e.g. from WO 2008/071801, WO 2010/130599 and WO 2010/130680, to which reference is made. They can be prepared by analogy to the methods described therein.

Suitable hyperbranched aliphatic oxygen containing polymers P are e.g. hyperbranched aliphatic polycarbonates, hyperbranched aliphatic polyureas, hyperbranched aliphatic polyamides, hyperbranched aliphatic polyurethanes, hyperbranched aliphatic polyesters, hyperbranched aliphatic polyethers, hyperbranched aliphatic polyestercarbonates, hyperbranched aliphatic polyethercarbonates, hyperbranched aliphatic polyetheresters, hyperbranched aliphatic polyesteramides, hyperbranched aliphatic polyesteramines, hyperbranched aliphatic polyetherestercarbonates and hyperbranched aliphatic polyetherurethanecarbonates.

Amongst the aforementioned hyperbranched aliphatic polymers those are preferred, which have carbonate groups within their polymer backbone. These polymers are also termed aliphatic polycarbonates. Besides the carbonate groups the aliphatic polycarbonates may contain further functional groups in the polymer backbone, such as ester groups, urethane groups and ether groups or combinations thereof. Depending on the type of functional group in the hyperbranched polycarbonate, these polymers are often termed polyestercarbonates, polyethercarbonates, poly(etherestercarbonates) and poly(etherurethanecarbonates).

Particular preference is given to non-ionic polycarbonates, polyestercarbonates, polyethercarbonates, poly(etherestercarbonates) and poly(etherurethanecarbonates).

Preference is given to hyperbranched polyethercarbonates, hyperbranched poly(etherestercarbonates) and hyperbranched poly(etherurethanecarbonates), which are in particular non-ionic. In poly(ethercarbonates), and likewise in hyperbranched poly(etherestercarbonates) and hyperbranched poly(etherurethanecarbonates), i.e. to hyperbranched polymers, which in addition to carbonate groups contain one or more polyether moieties. These polyether moieties are preferably derived from poly-$C_2$-$C_4$-alkyleneoxides, in particular form polyethelyeneoxides, polypropyleneoxides and poly(ethylenoxid-co-propylenoxide). The number average of $C_2$-$C_4$-alkyleneoxide repeating units within each polyether moiety may vary from 2 to 100, in particular from 4 to 50.

Hyperbranched poly(etherestercarbonates) are hyperbranched polymers which in addition to carbonate groups and polyether moieties contain ester groups which are preferably derived from aliphatic polycarboxylic acids having at least 2 carboxylic acid groups, such as succinic acid, glutaric acid, adipic acid, pimelic acid or suberic acid, or from hydroxycarboxylic acids or from the corresponding lactones, such as 4-hydroxybutyric acid, 5-hydroxyvaleric acid, 6-hydroxyhexanoic acid, butyrolacton, valerolacton or caprolactone.

Hyperbranched poly(etherurethanecarbonates) are hyperbranched polymers, which in addition to carbonate groups and polyether moieties contain urethane groups, which are preferably derived from aliphatic or cycloaliphatic polyisocyanates having at least 2, e.g. 2 to 4 isocyanate groups, such as hexamethylene diisocyanate, pentamethylenediisocyanate, tetramethylenediisocyanate, 1,5-diisocyanatohexane, 1,4-cyclohexane diisocyanate or isophorone diisocyanate.

In particular, the present invention relates to formulations, where the hyperbranched polymers is selected from poly(ethercarbonates), poly(etherurethanecarbonates) and poly(etherestercarbonates), which have a hyperbranched core of an aliphatic polycarbonate or polyethercarbonate and terminal aliphatic polyether groups.

The terminal aliphatic polyether moieties are preferably selected from poly-($C_2$-$C_3$-alkyleneoxide) groups and $C_1$-$C_4$-poly-($C_2$-$C_3$-alkyleneoxide) groups, in particular from polyethelyeneoxide, polypropyleneoxide, poly(ethylenoxid-co-propylenoxide), $C_1$-$C_4$-alkyl polyethelyeneoxide, $C_1$-$C_4$-alkyl polypropyleneoxide and $C_1$-$C_4$-alkyl poly(ethylenoxid-co-propylenoxide) groups, i.e. from poly-($C_2$-$C_3$-alkyleneoxide) groups which have either a terminal OH or a terminal $C_1$-$C_4$-alkyl group. The number average of $C_2$-$C_3$-alkyleneoxide repeating units within each terminal polyether group may vary from 4 to 100, in particular from 10 to 70. In particular terminal polyether moieties are preferred, wherein the ethylenoxide repeating units amount to at least 50% by weight, based on the total amount of alkyleneoxide repeating units in the terminal polyether moieties.

The terminal aliphatic polyether moieties may be directly attached to the hyperbranched core of an aliphatic polycarbonate or polyethercarbonate or they may be attached via a linker, such as an urethane or ester group or via a spacer A-L-A, where A indicates either —O—C(O)— or a —O—C(O)—NH— and L indicates a bivalent aliphatic radical having from 2 to 20 carbon atoms, where the bivalent aliphatic radical is preferably a linear, branched or cyclic saturated hydrocarbon radical having 2 to 20 carbon atoms, such as 1,2-ethandiyl, 1,2-propandiyl, 1,3-propandiyl, 1,4-butandiyl, 1,5-pentandiyl, 1,6-hexandiyl, 1,7-heptandiyl, 2-ethylhexan-1,6-diyl, 1,4-cyclohexandiyl, or a radical of the following formulae:

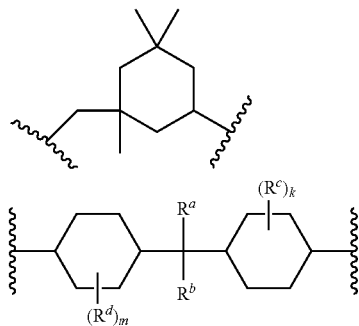

where $R^a$, $R^b$, independently of each other are hydrogen or methyl, $R^d$ and $R^c$ are methyl and k and m, independently of each other, are 0, 1 or 2.

Hyperbranched polycarbonates, including to hyperbranched poly(ethercarbonates), hyperbranched poly(etherestercarbonates) and hyperbranched poly(etherurethanecarbonates), that are suitable can be prepared, for example, by a process comprising the following steps a), b) and optionally c):

a) reacting at least one organic carbonate (A) of the general formula $R^xOC(=O)OR^y$ with at least one aliphatic alcohol (B) which contains at least 3 OH groups, with elimination of alcohols $R^xOH$ and $R^yOH$, to give one or more condensation products (K), b) intermolecularly reacting the condensation products (K) to give a high-functionality, hyperbranched polycarbonate, and c) optionally modifying the terminal groups of the high-functionality, hyperbranched polycarbonate In step a) the proportion of the OH groups to the carbonates in the reaction mixture are chosen such that the condensation products (K) contain on average either one carbonate group and more than one OH group, or one OH group and more than one carbonate group. The radicals $R^x$ and $R^y$ may have identical or different definitions. In one specific version $R^x$ and $R^y$ have the same definitions. Preferably $R^x$ and $R^y$ are selected from $C_1$-$C_{10}$ alkyl, $C_5$-$C_7$ cycloalkyl or $R^a$ and $R^b$ can also together be $C_2$-$C_6$ alkylene. With particular preference $R^a$ and $R^b$ are selected from straight-chain and branched $C_1$-$C_4$ alkyl, such as methyl, ethyl, n-propyl, isopropyl, n-butyl, 2-butyl, isobutyl or tert. butyl.

The organic carbonates are reacted with at least one aliphatic alcohol (B) which contains at least three OH groups or with mixtures of two or more different alcohols. Examples of compounds having at least three OH groups are aliphatic alcohols having at least three, e.g. 3, 4, 5 or 6 OH groups, including aliphatic alkanols having at least three, e.g. 3, 4, 5 or 6, OH groups and 3 to 20 carbon atoms such as glycerol, trimethylolmethane, trimethylolethane, trimethylolpropane, 1,2,4-butanetriol, tris(hydroxymethyl)amine, tris(hydroxyethyl)amine, tris(hydroxypropyl)amine, pentaerythritol, bis(trimethylolpropane) or di(pentaerythritol), di-, tri- or oligoglycerols, sugars, such as glucose, and aliphatic polyetherols that have a functionality of three or more and are based on aliphatic alcohols having 3 to 20 carbon atoms with a functionality of three or more. Aliphatic polyetherols that have a functionality of three or more and are prepared by reacting an aliphatic alcohol having 3 to 20 carbon atoms with a functionality of three or more with $C_2$-$C_4$-alkylene oxide such as ethylene oxide, propylene oxide or butylene oxide. Preferably the amount of alkyleneoxide is from 1 to 20 mol per mol of OH groups in the aliphatic alcohol having 3 to 20 carbon atoms. Particular preference is given to aliphatic alcohols having at least 3 hydroxyl groups and 3 to 20 carbon atoms, in particular to glycerol, trimethylolethane, trimethylolpropane, 1,2,4-butanetriol, pentaerythritol, and also the reaction products of said aliphatic alcohols with $C_2$-$C_4$-alkyleneoxides, in particular to the reaction products with ethylene oxide or propylene oxide, where the amount of alkyleneoxide is preferably from 1 to 20 mol per mol of OH groups in the aliphatic alcohol having 3 to 20 carbon atoms. A particular example of such a reaction product is the pentaerythritol alkoxylated with 3 to 60 mols of ethyleneoxide or propyleneoxide, per 1 mol of pentaerythritol.

These polyfunctional alcohols having 3 or more OH groups can also be used in a mixture with difunctional alcohols (EV), with the proviso that the average OH functionality of all of the alcohols used is together more than 2. Examples of suitable compounds having two OH groups comprise ethylene glycol, diethylene glycol, triethylene glycol, 1,2- and 1,3-propanediol, dipropylene glycol, tripropylene glycol, neopentyl glycol, 1,2-, 1,3-, and 1,4-butanediol, 1,2-, 1,3-, and 1,5-pentanediol, hexanediol, cyclopentanediol, cyclohexanediol, cyclohexanedimethanol, and difunctional polyetherols or polyesterols.

The reaction of the carbonate with the alcohol or alcohol mixture to give hyperbranched aliphatic polycarbonate takes place with elimination of the monofunctional alcohol from the carbonate molecule.

The hyperbranched polycarbonates formed in step b) usually have terminal hydroxyl groups carbonate groups, which are susceptible to further modification or functionalization.

Subsequent functionalization can be obtained by reacting the resultant high-functionality hyperbranched polycarbonate with a suitable functionalizing reagent that is able to react with the polycarbonate's OH and/or carbonate groups.

High-functionality, hyperbranched polycarbonates comprising hydroxyl groups can be modified, for example, by adding molecules comprising acid groups, ester groups, anhydride groups, lactone groups or isocyanate groups. Additionally, hyperbranched polycarbonates comprising terminal hydroxyl groups can also be converted into high-functionality polycarbonate-polyetherpolyols by reaction with alkylene oxides-ethylene oxide, propylene oxide or butylene oxide, for example.

In particularly preferred embodiments, the hyperbranched, oxygen containing aliphatic polymer is a hyperbranched aliphatic polyethercarbonate or a hyperbranched aliphatic poly(etherurethanecarbonate) which have a hyperbranched core of an aliphatic polycarbonate or polyethercarbonate and terminal aliphatic polyether groups as defined above and which are preferably selected from poly-($C_2$-$C_3$-alkyleneoxide) groups and $C_1$-$C_4$-poly-($C_2$-$C_3$-alkyleneoxide) groups. The number average of $C_2$-$C_3$-alkyleneoxide repeating units within each terminal polyether group may vary from 4 to 100, in particular from 10 to 70. In particular terminal polyether moieties are preferred, wherein the ethylenoxide repeating units amount to at least 50% by weight, based on the total amount of alkyleneoxide repeating units in the terminal polyether moieties. Amongst these, preference is given to those, where the core is obtained by reacting an organic carbonate with a compound having at least 3 hydroxyl groups, which is selected from aliphatic alcohols having at least 3 hydroxyl groups and 3 to 20 carbon atoms and the reaction products of said aliphatic alcohols with $C_2$-$C_4$-alkyleneoxides.

In particular, the formulations of the present invention contain components a) to f) in the following relative amounts, where each amount given in % by weight is based on the weight of the formulation:

a) from 1 to 30% by weight, in particular from 2 to 27% by weight or from 3 to 25% by weight of the at least one pesticide compound;
b) from 3 to 30% by weight, in particular from 5 to 20% by weight or from 7 to 15% by weight of the at least one organic solvent LM1;
c) from 1 to 20% by weight, in particular from 2 to 15% by weight or from 2 to 10% by weight of at least one solvent LM2;
d) from 5 to 50% by weight, in particular from 8 to 30% by weight or from 10 to 25% by weight of at least one solvent LM3;
e) from 5 to 40% by weight, in particular from 7 to 35% by weight or from 10 to 30% by weight of the at least one surfactant; and
f) from 5 to 50% by weight, in particular from 10 to 40% by weight of water and optionally g) from 1 to 30% by weight, in particular from 5 to 25% by weight or from 10 to 20% by weight of at least one solvent LM4.

More particularly the formulations of the present invention contain components a) to f) in the following relative amounts, where each amount given in % by weight is based on the weight of the formulation:

a) from 1 to 30% by weight, in particular from 2 to 27% by weight or from 3 to 25% by weight of the at least one pesticide compound;
b) from 3 to 30% by weight, in particular from 5 to 20% by weight or from 7 to 15% by weight of the at least one organic solvent LM1;
c) from 1 to 20% by weight, in particular from 2 to 15% by weight or from 2 to 10% by weight of at least one solvent LM2;
d) from 5 to 50% by weight, in particular from 8 to 30% by weight or from 10 to 25% by weight of at least one solvent LM3;
e) from 5 to 40% by weight, in particular from 7 to 35% by weight or from 10 to 30% by weight of the at least one surfactant; and
f) from 5 to 50% by weight, in particular from 10 to 40% by weight of water.
h) from 2 to 25% by weight, in particular from 3 to 20% by weight or from 5 to 15% by weight of at least one solvent LM2;

and optionally g) from 1 to 30% by weight, in particular from 5 to 25% by weight or from 10 to 20% by weight of at least one solvent LM4.

The formulations of the present invention may further contain customary auxiliaries, such as defoamers, preservatives, colorants, stabilizers, stickers and the like which are usually employed in aqueous formulations of pesticide. The total amount of these auxiliaries will usually not exceed 50% by weight, in particular 3% by weight, especially 2% by weight of the formulation.

Suitable preservatives to prevent microbial spoiling of the compositions of the invention include formaldehyde, alkyl esters of p-hydroxybenzoic acid, sodium benzoate, 2-bromo-2-nitropropane-1,3-diol, o-phenylphenol, thiazolinones, such as benzisothiazolinone, 5-chloro-2-methyl-4-isothiazolinone, pentachlorophenol, 2,4-dichlorobenzyl alcohol and mixtures thereof. If desired, the concentration of preservatives will be from 0.1 to 10 g/l of the formulation.

Suitable defoamers include polysiloxanes, such as polydimethyl siloxane. If desired, the concentration of defoamers is usually from 0.1 to 5 g/l of the formulation.

Suitable stabilizers comprise e.g. UV-absorbers, such as cinnamic esters, 3,3 diphenyl 2-cyano acrylates, hydroxy and/or alkoxy substituted benzophenones, N-(hydroxyphenyl)-benzotriazoles, hydroxyphenyl-s-triazines, oxalic amides and salicylates, e.g. the UVINUL® 3000, 3008, 3040, 3048, 3049, 3050, 3030, 3035, 3039, 3088, UVINUL® MC80 and radical scavengers, e.g. ascorbic acid, citric acid, sterically hindered amines (HALS-compounds) such as UVINUL® 4049H, 4050H and 5050H, and the like and anti-oxidants, such as vitamin E. In a preferred embodiment the stabiliser is citric acid or ascorbic acid. If desired, the concentration of stabilizer will be from 0.01 to 10 g/l of the microemulsion composition.

Suitable stickers/adhesion agents include polyvinylalcohols, polyvinylpyrrolidones, polyacrylates, polymethacrylates, polybutenes, polyisobutylenes, polystyrene, polyethyleneamines, polyethyleneamides, polyethyleneimines (Lupasol®, Polymin®), polyethers and copolymers derived from these polymers.

If the formulation of the present invention is intended for seed treatment purposes, the formulation may optionally comprise also dyes or pigments. Suitable pigments or dyes for seed treatment formulations are pigment blue 15:4, pigment blue 15:3, pigment blue 15:2, pigment blue 15:1, pigment blue 80, pigment yellow 1, pigment yellow 13, pigment red 112, pigment red 48:2, pigment red 48:1, pigment red 57:1, pigment red 53:1, pigment orange 43, pigment orange 34, pigment orange 5, pigment green 36, pigment green 7, pigment white 6, pigment brown 25, basic violet 10, basic violet 49, acid red 51, acid red 52, acid red 14, acid blue 9, acid yellow 23, basic red 10, basic red 108.

These customary auxiliaries may be contained within the formulation of the present invention. However, it is also possible to add these auxiliaries after dilution with water to the ready-to-use aqueous composition.

The formulations of the present invention can be simply prepared by mixing the ingredients until an apparently homogeneous liquid has been formed. The sequence of the addition of the ingredients is of minor importance. For example, the ingredients can be given into a vessel and the thus obtained mixture is homogenized, e.g. by stirring, until an apparently homogeneous liquid has been formed. However, it is also possible to dissolve the pesticide component a) in at least one of the organic solvents LM1 and or LM2 or in the mixture of said solvents and surfactant and to mix the thus obtained solution with water and the remaining ingredients, e.g. by adding the solution to water or by addition of water to the solution. The temperature of mixing and the mixing conditions are of minor importance. Usually the ingredients are mixed at a temperature ranging from 10 to 90° C., in particular from 10 to 60° C. Higher temperatures, e.g. 35° C. or 40° C. or higher might be useful to expedite the formation of the formulation. However, mixing can also be achieved at lower temperatures e.g. from 10° C. to 35° C. or 40° C.

If the formulations of the present invention contain at least one insecticide compound, they are particularly useful for combating arthropod pests, such as insects and arachnids, in particular acarid pests. These formulations are particularly useful for combating plant pathogenic insect and arachnid pests but also ectoparasitic insect and acarid pests and arthropod pests which are capable of attacking or infesting non-living materials. Therefore, these formulations of the present invention can be used for plant protection against infestation by arthropod pests but also for protecting warm blooded animals, birds and fish from infestation or attack by ectoparasitic insect and acarid pests.

If the formulations of the present invention contain at least one fungicide compound, they are particularly useful for combating phytopathogenic fungi.

Therefore the present invention also relates to the use of the formulations described herein for combating pests;

the use of the formulations described herein for plant protection;

the use of the formulations described herein for protection of non-living material against attack or infestation by pests;

the compounds for use in protecting warm blooded animals, birds and fish from infestation or attack by ectoparasitic insect and acarid pests;

a method combating pests, which comprises contacting said pests, their habitat, breeding ground, food supply, plant, seed, soil, area, material or environment in which the pests are growing or may grow, or the materials, plants, seeds, soils, surfaces or spaces to be protected from attack or infestation by said pests with an effective amount of a formulation as described herein;

a method for protecting cultivated plants, such as crops, from attack or infestation by pests which comprises contacting the crop with an effective amount of a formulation as described herein;

a method for protecting plant propagation material from attack or infestation by pests which comprises contacting the plant propagation material with an effective amount of a formulation as described herein;

a method for protecting non-living goods from attack or infestation by pests which comprises contacting the non-living goods with an effective amount of a formulation as described herein; and a method for protecting non-human animals from attack or infestation by pests which comprises contacting the non-human animals with an effective amount of a formulation as described herein.

The term "plant protection" as used herein includes:
combating plant pathogenic pests in cultures of plants;
protection of plants, in particular crop plants, against attack by plant pathogenic pests;
protection of plant propagation material, in particular seeds, against attack or infestation by pests; and/or
improving plant health.

The term "plant propagation material" is to be understood to denote all the generative parts of the plant such as seeds and vegetative plant material, such as cuttings and tubers (e.g. potatoes), which can be used for the multiplication of the plant. This includes seeds, roots, fruits, tubers, bulbs, rhizomes, shoots, sprouts and other parts of plants. Seedlings and young plants, which are to be transplanted after germination or after emergence from soil, may also be included. These plant propagation materials may be treated prophylactically with a plant protection compound either at or before planting or transplanting.

Examples of crop plants in which the formulations can be used, include are not limited to cereals, for example wheat, rye, barley, triticale, oats or rice; beet, for example sugar or fodder beet; pome fruit, stone fruit and soft fruit, for example apples, pears, plums, peaches, almonds, cherries, strawberries, raspberries, currants or goose-berries; legumes, for example beans, lentils, peas, lucerne or soybeans; oil crops, for example oilseed rape, mustard, olives, sunflowers, coconut, cacao, castor beans, oil palm, peanuts or soybeans; cucurbits, for example pumpkins/squash, cucumbers or melons; fiber crops, for ex-ample cotton, flax, hemp or jute; citrus fruit, for example oranges, lemons, grapefruit or tangerines; vegetable plants, for example spinach, lettuce, asparagus, cabbages, carrots, onions, tomatoes, potatoes, pumpkin/squash or capsicums; plants of the laurel family, for example avocados, cinnamon or camphor; energy crops and industrial feedstock crops, for example maize, soybeans, wheat, oilseed rape, sugar cane or oil palm; maize; tobacco; nuts; coffee; tea; bananas; wine (dessert grapes and grapes for vinification); hops; grass, for example turf; sweetleaf (*Stevie rebaudania*); rubber plants and forest plants, for example flowers, shrubs, deciduous trees and coniferous trees, and propagation material, for example seeds, and harvested produce of these plants.

The term "crop plants" also includes those plants which have been modified by breeding, mutagenesis or recombinant methods, including the biotechnological agricultural products which are on the market or in the process of being developed. Genetically modified plants are plants whose genetic material has been modified in a manner which does not occur under natural conditions by hybridizing, mutations or natural recombination (i.e. recombination of the genetic material). Here, one or more genes will, as a rule, be integrated into the genetic material of the plant in order to improve the plant's properties. Such recombinant modifications also comprise posttranslational modifications of proteins, oligo- or polypeptides, for example by means of glycosylation or binding polymers such as, for example, prenylated, acetylated or farnesylated residues or PEG residues.

The formulations of the present invention which contain an insecticide compound may be used to protect growing plants and crops from attack or infestation by insects by contacting the plant/crop with a pesticidally effective amount of the formulation. The term "crop" refers both to growing and harvested crops.

The formulations of the present invention which contain at least one insecticide compound, are particularly important in the control of a multitude of insects on various cultivated plants, such as cereal, root crops, oil crops, vegetables, spices, ornamentals, for example seed of durum and other wheat, barley, oats, rye, maize (fodder maize and sugar maize/sweet and field corn), soybeans, oil crops, crucifers, cotton, sunflowers, bananas, rice, oilseed rape, turnip rape, sugarbeet, fodder beet, eggplants, potatoes, grass, lawn, turf, fodder grass, tomatoes, leeks, pumpkin/squash, cabbage, iceberg lettuce, pepper, cucumbers, melons, *Brassica* species, melons, beans, peas, garlic, onions, carrots, tuberous plants such as potatoes, sugar cane, tobacco, grapes, petunias, geranium/pelargoniums, pansies and impatiens.

In most instances, the formulations of the present invention are diluted with water before being applied to the locus to be treated. The formulations of the present invention are usually diluted with at least 1 part of water, preferably at least 10 parts of water, in particular at least 100 parts of water, e.g. with 1 to 10,000, in particular from 100 to 5,000 and more preferably with 500 to 2,000 parts of water per one part of the formulation (all parts are given in parts by weight).

Dilution will be usually achieved by pouring the formulations of the present invention into water. Usually, dilution is achieved with agitation, e.g. with stirring, to ensure a rapid mixing of the formulation in water. However, agitation is not necessary. Though the temperature of mixing is not critical, mixing is usually performed at temperatures ranging from 0 to 50° C., in particular from 10 to 30° C. or at ambient temperature. The water used for mixing is usually tap water. However the water may already contain water soluble compounds which are used in plant protection, e.g. nutrients, fertilizers or water soluble pesticides.

The formulations of the present invention after dilution are applied by usual means which are familiar to a skilled person.

The formulations of the present invention, which contain an insecticide, such as a phenylpyrazole compound and/or a pyrethroid compound, may e.g. be applied against the following pests:

Insects from the order of the lepidopterans (*Lepidoptera*), for example *Acronicta major, Adoxophyes orana, Aedia leucomelas, Agrotis* spp. such as *Agrotis fucosa, Agrotis segetum, Agrotis ypsilon; Alabama argillacea, Anticarsia gemmatalis, Anticarsia* spp., *Argyresthia conjugella, Autographa gamma, Barathra brassicae, Bucculatrix thurberiella, Bupalus piniarius, Cacoecia murinana, Cacoecia podana, Capua reticulana, Carpocapsa pomonella, Cheimatobia brumata, Chilo* spp. such as *Chilo suppressalis; Choristoneura fumiferana, Choristoneura occidentalis, Cirphis unipuncta, Clysia ambiguella, Cnaphalocerus* spp., *Cydia pomonella, Dendrolimus pini, Diaphania nitidalis, Diatraea grandiosella, Earias insulana, Elasmopalpus lignosellus, Ephestia cautella, Ephestia kuehniella, Eupoecilia ambiguella, Euproctis chrysorrhoea, Euxoa* spp., *Evetria bouliana, Feltia* spp. such as *Feltia subterranean; Galleria mellonella, Grapholitha funebrana, Grapholitha molesta, Helicoverpa* spp. such as *Helicoverpa armigera, Helicoverpa zea; Heliothis* spp. such as *Heliothis armigera, Heliothis virescens, Heliothis zea; Hellula undalis, Hibernia defoliaria, Hofmannophila pseudospretella, Homona magnanima, Hyphantria cunea, Hyponomeuta padella, Hyponomeuta malinellus, Keiferia lycopersicella, Lambdina fiscellaria, Laphygma* spp. such as *Laphygma exigua; Leucoptera coffeella, Leucoptera schella, Lithocolletis blancardella, Lithophane antennata, Lobesia botrana, Loxagrotis albicosta, Loxostege sticticalis, Lymantria* spp. such as *Lymantria dispar, Lymantria monacha; Lyonetia clerkella, Malacosoma neustria, Mamestra* spp. such as *Mamestra brassicae; Mocis repanda, Mythimna separates, Orgyia pseudotsugata, Oria* spp., *Ostrinia* spp. such as *Ostrinia nubilalis; Oulema oryzae, Panolis flammea, Pectinophora* spp. such as *Pectinophora gossypiella; Peridroma saucia, Phalera bucephala, Phthorimaea* spp. such as *Phthorimaea operculella; Phyllocnistis citrella, Pieris* spp. such as *Pieris brassicae, Pieris rapae; Plathypena scabra, Plutella maculipennis, Plutella xylostella, Prodenia* spp., *Pseudaletia* spp., *Pseudoplusia includens, Pyrausta nubilalis, Rhyacionia frustrana, Scrobipalpula absoluta, Sitotroga cerealella, Sparganothis pilleriana, Spodoptera* spp. such as *Spodoptera frugiperda, Spodoptera littoralis, Spodoptera litura; Thaumatopoea pityocampa, Thermesia gemmatalis, Tinea pellionella, Tineola bisselliella, Tortrix viridana, Trichoplusia* spp. such as *Trichoplusia ni; Tuta absoluta*, and *Zeiraphera canadensis;*

Beetles (*Coleoptera*), for example *Acanthoscehdes obtectus, Adoretus* spp., *Agelastica alni, Agaus sinuatus, Agriotes* spp. such as *Agriotes fuscicollis, Agriotes lineatus, Agriotes obscurus; Amphimallus solstitialis, Anisandrus dispar, Anobium punctatum, Anomala rufocuprea, Anoplophora* spp. such as *Anoplophora glabribennis; Anthonomus* spp. such as *Anthonomus grandis, Anthonomus pomorum; Anthrenus* spp., *Aphthona euphoridae, Apogonia* spp., *Athous haemorrhoidalis, Atomaria* spp. such as *Atomaria linearis; Atta-* genus spp., *Aulacophora femoralis, Blastophagus piniperda, Blitophaga undata, Bruchidius obtectus, Bruchus* spp. such as *Bruchus lentis, Bruchus pisorum, Bruchus rufimanus; Byctiscus betulae, Callosobruchus chinensis, Cassida nebulosa, Cerotoma trifurcata, Cetonia aurata, Ceuthorhynchus* spp. such as *Ceuthorrhynchus assimilis, Ceuthorrhynchus nap; Chaetocnema tibialis, Cleonus mendicus, Conoderus* spp. such as *Conoderus vespertinus; Cosmopolites* spp., *Costelytra zealandica, Crioceris asparagi, Cryptorhynchus lapathi, Ctenicera* ssp. such as *Ctenicera destructor; Curculio* spp., *Dectes texanus, Dermestes* spp., *Diabrotica* spp. such as *Diabrotica* 12-*punctata Diabrotica speciosa, Diabrotica longicornis, Diabrotica semipunctata, Diabrotica virgifera; Epilachna* spp. such as *Epilachna varivestis, Epilachna vigintioctomaculata; Epitrix* spp. such as *Epitrix hirtipennis; Eutinobothrus braslliensis, Faustinus cubae, Gibbium psylloides, Heteronychus arator, Hylamorpha elegans, Hylobius abietis, Hylotrupes bajulus, Hypera brunneipennis, Hypera postica, Hypothenemus* spp., *Ips typographus, Lachnosterna consanguinea, Lema bllineata, Lema melanopus, Leptinotarsa* spp. such as *Leptinotarsa decemlineata; Limonius californicus, Lissorhoptrus oryzophllus, Lissorhoptrus oryzophilus, Lixus* spp., *Lyctus* spp. such as *Lyctus bruneus; Melanotus communis, Meligethes* spp. such as *Meligethes aeneus; Melolontha hibpocastani, Melolontha melolontha, Migdolus* spp., *Monochamus* spp. such as *Monochamus alternatus; Naupactus xanthographus, Nibtus hololeucus, Oryctes rhinoceros, Oryzaephllus surinamensis, Otiorrhynchus sulcatus, Otiorrhynchus ovatus, Otiorrhynchus sulcatus, Oulema oryzae, Oxycetonia jucunda, Phaedon cochleariae, Phyllobius pyri, Phyllopertha horticola, Phyllophaga* spp., *Phyllotreta* spp. such as *Phyllotreta chrysocephala, Phyllotreta nemorum, Phyllotreta striolata; Phyllophaga* spp., *Phyllopertha horticola, Popillia japonica, Premnotrypes* spp., *Psylliodes chrysocephala, Ptinus* spp., *Rhizobius ventralis, Rhizopertha dominica, Sitona lineatus, Sitophilus* spp. such as *Sitophilus granaria, Sitophilus zeamais; Sphenophorus* spp. such as *Sphenophorus levis; Sternechus* spp. such as *Sternechus subsignatus; Symphyletes* spp., *Tenebrio molitor, Tribolium* spp. such as *Tribolium castaneum; Trogoderma* spp., *Tychius* spp., *Xylotrechus* spp., and *Zabrus* spp. such as *Zabrus tenebrioides;*

Flies, mosquitoes (Diptera), e.g. *Aedes* spp. such as *Aedes aegypti, Aedes albopictus, Aedes vexans; Anastrepha ludens, Anopheles* spp. such as *Anopheles albimanus, Anopheles crucians, Anopheles freeborni, Anopheles gambiae, Anopheles leucosphyrus, Anopheles maculipennis, Anopheles minimus, Anopheles quadrimaculatus, Anopheles sinensis; Bibio hortulanus, Calliphora erythrocephala, Calliphora vicina, Cerafitis capitata, Ceratifis capitata, Chrysomyia* spp. such as *Chrysomya bezziana, Chrysomya hominivorax, Chrysomya macellaria; Chrysops atlanticus, Chrysops discalis, Chrysops silacea, Cochliomyia* spp. such as *Cochliomyia hominivorax; Contarinia* spp. such as *Contarinia sorghicola; Cordylobia anthropophaga, Culex* spp. such as *Culex nigripalpus, Culex pipiens, Culex quinquefasciatus, Culex tarsalis, Culex tritaeniorhynchus; Culicoides furens, Culiseta inornata, Culiseta melanura, Cuterebra* spp., *Dacus cucurbitae, Dacus oleae, Dasineura brassicae, Delia* spp. such as *Delia antique, Delia coarctata, Delia platura, Delia radicum; Dermatobia hominis, Drosophila* spp., *Fannia* spp. such as *Fannia canicularis; Gastraphilus* spp. such as *Gasterophilus intestinalis; Geomyza Tripunctata, Glossina fuscipes, Glossina morsitans, Glossina palpalis, Glossina tachinoides, Haematobia irritans, Haplodiplosis equestris, Hippelates* spp., *Hylemyia* spp. such as *Hylemyia platura; Hypoderma* spp. such as *Hypoderma lineata; Hyppobosca* spp., *Leptoconops torrens, Liriomyza* spp. such as *Liriomyza sativae, Liriomyza trifolii; Lucilia* spp. such as *Lucilia caprina, Lucilia cuprina, Lucilia sericata; Lycoria pectoraiis, Mansonia titillanus, Mayetiola* spp. such as *Mayetiola destructor; Musca* spp. such as *Musca autumnalis, Musca domestica; Muscina stabulans, Oestrus* spp. such as *Oestrus ovis; Opomyza florum, Oscinella* spp. such as *Oscinella frit; Pegomya hysocyami, Phlebotomus argentipes, Phorbia* spp. such as *Phorbia antiqua, Phorbia brassicae, Phorbia coarctata; Prosimulium mixtum, Psila rosae, Psorophora columbiae, Psorophora discolor, Rhagoletis cerasi, Rhagoletis pomonella, Sarcophaga* spp. such as *Sarcophaga haemorrhoidalis; Simulium vittatum, Stomoxys* spp. such as *Stomoxys calcitrans; Tabanus* spp. such as *Tabanus atratus, Tabanus bovinus, Tabanus lineola, Tabanus similis; Tannia* spp., *Tipula oleracea, Tipula paludosa*, and *Wohlfahrtia* spp.;

Thrips (Thysanoptera), e.g. *Baliothros biformis, Dichromothros corbetti, Dichromothros* ssp., *Enneothrips flavens, Frankliniella* spp. such as *Frankliniella fusca, Frankliniella occidentalis, Frankliniella tritici; Heliothrips* spp., *Hercinothros femoralis, Kakothros* spp., *Rhipihorothros cruentatus, Scirtothrips* spp. such as *Scirtothrips citri; Taeniothros cardamoni, Thrips* spp. such as *Thrips oryzae, Thrips palmi, Thrips tabaci;*

Termites (Isoptera), e.g. *Calotermes flavicollis, Coptotermes formosanus, Heterotermes aureus, Heterotermes longiceps, Heterotermes tenuis, Leucotermes flavipes, Odontotermes* spp., *Reticulitermes* spp. such as *Reticulitermes speratus, Reticulitermes flavipes, Reticulitermes grassei, Reticulitermes lucifugus, Reticulitermes santonensis, Reticulitermes virginicus; Termes natalensis;*

Cockroaches (Blattaria-Blattodea), e.g. *Acheta domesticus, Blatta orientalis, Blattella asahinae, Blattella germanica, Gryllotalpa* spp., *Leucophaea maderae, Locusta* spp., *Melanoplus* spp., *Periplaneta americana, Periplaneta australasiae, Periplaneta brunnea, Periplaneta fuligginosa, Periplaneta japonica;*

Bugs, aphids, leafhoppers, whiteflies, scale insects, cicadas (Hemiptera), e.g. *Acrosternum* spp. such as *Acrosternum Mare; Acyrthosipon* spp. such as *Acyrthosiphon onobrychis, Acyrthosibhon pisum; Adelges laricis, Aeneolamia* spp., *Agonoscena* spp., *Aleurodes* spp., *Aleurolobus barodensis, Aleurothrixus* spp., *Amrasca* spp., *Anasa tristis, Antestiopsis* spp., *Anuraphis cardui, Aonidiella* spp., *Aphanostigma pin; Aphidula nasturtii, Aphis* spp. such as *Aphis fabae, Aphis forbesi, Aphis gossypii, Aphis grossulariae, Aphis pomi, Aphis sambuci, Aphis schneideri, Aphis spiraecola; Arboridia apicalis, Arilus critatus, Aspidiella* spp., *Aspidiotus* spp., *Atanus* spp., *Aulacorthum solani, Bemisia* spp. such as *Bemisia argentifolii, Bemisia tabaci; Blissus* spp. such as *Blissus leucopterus; Brachycaudus cardui, Brachycaudus helichrysi, Brachycaudus persicae, Brachycaudus prunicola, Brachycolus* spp., *Brevicoryne brassicae, Calligypona marginata, Calocoris* spp., *Campylomma livida, Capitophorus horni, Carneocephala fulgida, Cavelerius* spp., *Ceraplastes* spp., *Ceratovacuna lanigera, Cercopidae, Cerosibha gossypii, Chaetosibhon fragaefolii, Chionaspis tegalensis, Chlorita onukii, Chromaphil juglandicola, Chrysomphalus ficus, Cicadulina mbila, Cimex* spp. such as *Cimex hemibterus, Cimex lectularius; Coccomytilus halli, Coccus* spp., *Creontiades dilutus, Cryptomyzus ribis, Cryptomyzus ribis, Cyrtopeltis notatus, Dalbulus* spp., *Dasynus piperis, Dialeuracies* spp., *Diaphorina* spp., *Diaspis* spp., *Dichelops furcatus, Diconocoris hewetti, Doralis* spp., *Dreyfusia nordmannianae, Dreyfusia piceae, Drosicha* spp., *Dysaphis* spp. such as *Dysaphis plantaginea, Dysaphis pyri, Dysaphis radicola; Dysaulacorthum pseudosolani, Dysdercus* spp. such as *Dysdercus cingulatus, Dysdercus intermedius; Dysmicoccus* spp., *Empoasca* spp. such as *Empoasca fabae, Empoasca solana; Eriosoma* spp., *Erythroneura* spp., *Eurygaster* spp. such as *Eurygaster integriceps; Euscelis bilobatus, Euschistus* spp. such as *Euschistuos heros, Euschistus impictiventris, Euschistus servus; Geococcus coffeae, Halyomorpha* spp. such as *Halyomorpha halys; Heliopeltis* spp., *Homalodisca coagulata, Horcias nobllellus, Hyalopterus pruni, Hyperomyzus lactucae, Icerya* spp., *Idiocerus* spp., *Idioscopus* spp., *Laocielphax striatellus, Lecanium* spp., *Lepidosaphes* spp., *Leptocorisa* spp., *Leptoglossus phyllopus, Libaphis erysimi, Lygus* spp. such as *Lygus hesperus, Lygus lineolaris, Lygus pratensis; Macropes excavatus, Macrosiphum* spp. such as *Macrosibhum rosae, Macrosibhum avenae, Macrosibhum euphorbiae; Mahanarva fimbriolata, Megacopta cribraria, Megoura viciae, Melanaphis pyrarius, Melanaphis sacchari, Metcafiella* spp., *Metopolophium dirhodum, Miridae* spp., *Monellia costalis, Monelliopsis pecanis, Myzus* spp. such as *Myzus ascalonicus, Myzus cerasi, Myzus persicae, Myzus varians; Nasonovia ribis-nigri, Nephotettix* spp. such as *Nephotettix malayanus, Nephotettix nigropictus, Nephotettix parvus, Nephotettix virescens; Nezara* spp. such as *Nezara viridula; Nilaparvata lugens, Oebalus* spp., *Oncometopia* spp., *Orthezia praelonga, Parabemisia myricae, Paratrioza* spp., *Parlatoria* spp., *Pemphigus* spp. such as *Pemphigus bursarius; Pentomidae, Peregrinus maidis, Perkinsiella saccharicida, Phenacoccus* spp., *Phloeomyzus passerinii, Phorodon humuli, Phylloxera* spp., *Piesma quadrata, Piezodorus* spp. such as *Piezodorus guildinii, Pinnaspis aspidistrae, Planococcus* spp., *Protopulvinaria pyriformis, Psallus seriatus, Pseudacysta persea, Pseudaulacaspis pentagona, Pseudococcus* spp. such as *Pseudococcus comstocki; Psylla* spp. such as *Psylla mall, Psylla piri; Pteromalus* spp., *Pyrilla* spp., *Quadraspidiotus* spp., *Quesada gigas, Rastrococcus* spp., *Reduvius senilis, Rhodnius* spp., *Rhopalomyzus ascalonicus, Rhopalosiphum* spp. such as *Rhopalosiphum pseudobrassicas, Rhopalosiphum insertum, Rhopalosiphum maidis, Rhopalosiphum padi; Sagatodes* spp., *Sahlbergella singularis, Saissetia* spp., *Sappaphis mala, Sappaphis mali, Scaphoides titanus, Schizaphis graminum, Schizoneura lanuginosa, Scotinophora* spp., *Selenaspidus articulatus, Sitobion avenae, Sogata* spp., *Sogatella furcifera, Solubea insularis, Stephanitis nashi, Stictocephala festina, Tenalaphara malayensis, Thyanta* spp. such as *Thyanta perditor; Tibraca* spp., *Tinocallis caryaefoliae, Tomaspis* spp., *Toxoptera* spp. such as *Toxoptera aurantii; Trialeurodes* spp. such as *Trialeurodes vaporariorum; Triatoma* spp., *Trioza* spp., *Typhlocyba* spp., *Unaspis* spp. such as *Unaspis yanonensis;* and *Viteus vitifolii;*

Ants, bees, wasps, sawflies (Hymenoptera), e.g. *Athalia rosae, Atta capiguara, Atta cephalotes, Atta cephalotes, Atta laevigata, Atta robusta, Atta sexdens, Atta texana, Bombus* spp., *Camponotus floridanus, Crematogaster* spp., *Dasymutilla occidentalis, Diprion* spp., *Dolichovespula maculata, Hoplocampa* spp. such as *Hoplocampa minuta, Hoplocampa testudinea; Lasius* spp. such as *Lasius niger, Linepithema humile, Monomorium pharaonis, Paravespula germanica, Paravespula pennsylvanica, Paravespula vulgaris, Pheidole megacephala, Pogonomyrmex barbatus, Pogonomyrmex californicus, Polistes rubiginosa, Solenopsis geminata, Solenopsis invicta, Solenopsis richten, Solenopsis xyloni, Vespa* spp. such as *Vespa crabro,* and *Vespula squamosal;*

Crickets, grasshoppers, locusts (Orthoptera), e.g. *Acheta domestica, Calliptamus italicus, Chortoicetes terminifera, Dociostaurus maroccanus, Gryllotalpa africana, Gryllotalpa, Hieroglyphus daganensis, Kraussaria angulifera, Locusta migratoria, Locustana pardalina, Melanoplus bivittatus, Melanoplus femurrubrum, Melanoplus mexicanus, Melanoplus sanguinipes, Melanoplus spretus, Nomadacris septemfasciata, Oedaleus senegalensis, Schistocerca americana, Schistocerca gregaria, Tachycines asynamorus,* and *Zonozerus variegatus;*

Earwigs (Dermaptera), e.g. *forficula auricularia,*

Lice (Phthiraptera), e.g. *Damalinia* spp., *Pediculus* spp. such as *Pediculus humanus capitis, Pediculus humanus corporis; Pthirus pubis, Haematopinus* spp. such as *Haematopinus eurysternus, Haematopinus suis; Linognathus* spp. such as *Linognathus vituli; Bovicola bovis, Menopon gallinae, Menacanthus stramineus* and *Soienopotes capillatus, Trichodectes* spp.;

Fleas (Siphonaptera), e.g. *Ceratophyllus* spp., *Ctenocephalides felis, Ctenocephalides canis, Xenopsylla cheopis, Pulex irritans, Tunga penetrans,* and *Nosopsyllus fasciatus.*

The compounds of the formula (I) are also suitable for efficiently combating arthropod pests different from insects such as, in particular the following pests:

Arachnids (Arachnida), such as acari, e.g. of the families Argasidae, Ixodidae and Sarcoptidae, such as *Amblyomma* spp. (e.g. *Amblyomma americanum, Amblyomma variegatum, Amblyomma maculatum), Argas* spp. (e.g. *Argas persicus), Boophilus* spp. (e.g. *Boophilus annulatus, Boophilus decoloratus, Boophilus microplus), Dermacentor silvarum, Dermacentor andersoni, Dermacentor variabilis, Hyalomma* spp. (e.g. *Hyalomma truncatum), Ixodes* spp. (e.g. *Ixodes ricinus, Ixodes rubicundus, Ixodes scapularis, Ixodes holocyclus, Ixodes pacificus), Ornithodorus* spp. (e.g. *Ornithodorus moubata, Ornithodorus hermsi, Ornithodorus turicata), Ornithonyssus bacoti, Otobius megnini, Dermanyssus gallinae, Psoroptes* spp. (e.g. *Psoroptes ovis), Rhipicephalus* spp. (e.g. *Rhipicephalus sanguineus, Rhipicephalus appendiculatus, Rhipicephalus evertsi), Rhizoglyphus* spp., *Sarcoptes* spp. (e.g. *Sarcoptes scabiei),* and *Eriophyidae* spp. such as *Acaria sheldoni, Aculops* spp. (e.g. *Aculops pelekassi) Aculus* spp. (e.g. *Aculus schlechtendali), Epitrimerus pyri, Phyllocoptruta oleivora* and *Eriophyes* spp. (e.g. *Eriophyes sheldoni); Tarsonemidae* spp. such as *Hemitarsonemus* spp., *Phytonemus pallidus* and *Polyphagotarsonemus latus, Stenotarsonemus* spp.; *Tenuipalpidae* spp. such as *Brevipalpus* spp. (e.g. *Brevipalpus phoenicis); Tetranychidae* spp. such as *Eotetranychus* spp., *Eutetranychus* spp., *Oligonychus* spp., *Tetranychus cinnabarinus, Tetranychus kanzawai, Tetranychus pacificus, Tetranychus telarius* and *Tetranychus urticae; Bryobia praetiosa, Panonychus* spp. (e.g. *Panonychus ulmi, Panonychus citri), Metatetranychus* spp. and *Oligonychus* spp. (e.g. *Oligonychus pratensis), Vasates lycopersici; Araneida,* e.g. *Latrodectus mactans,* and *Loxosceles reclusa.* And *Acarus siro, Chorioptes* spp., *Scorpio maurus;*

Silverfish, firebrat (Thysanura), e.g. *Lepisma saccharin* and *Thermobia domestica;*

Centipedes (Chilopoda), e.g. *Geophilus* spp., *Scutigera* spp. such as *Scutigera coleoptrata;*

Millipedes (Diplopoda), e.g. *Blaniulus guttulatus, Narceus* spp.,

Springtails (Collembola), e.g. *Onychiurus* ssp. such as *Onychiurus armatus,*

They are also suitable for controlling nematodes: plant parasitic nematodes such as root knot nematodes, *Meloidogyne hapla, Meloidogyne incognita, Meloidogyne*

*javanica*, and other *Meloidogyne* species; cyst-forming nematodes, *Globodera rostochiensis* and other *Globodera* species; *Heterodera avenae, Heterodera glycines, Heterodera schachtii, Heterodera trifolii*, and other *Heterodera* species; Seed gall nematodes, *Anguina* species; Stem and foliar nematodes, *Aphelenchoides* species such as *Aphelenchoides besseyi*; Sting nematodes, *Belonolaimus longicaudatus* and other *Belonolaimus* species; Pine nematodes, *Bursaphelenchus lignicolus Mamiya* et *Klyohara, Bursaphelenchus xylophlius* and other *Bursaphelenchus* species; Ring nematodes, *Criconema* species, *Criconemella* species, *Criconemoides* species, *Mesocriconema* species; Stem and bulb nematodes, *Ditylenchus* destructor, *Ditylenchus dispaci* and other *Ditylenchus* species; Awl nematodes, *Dolichodorus* species; Spiral nematodes, *Heliocotylenchus multicinctus* and other *Helicotylenchus* species; Sheath and sheathoid nematodes, *Hemicycliophora* species and *Hemicriconemoides* species; *Hirshmanniella* species; Lance nematodes, *Hoploaimus* species; false rootknot nematodes, *Nacobbus* species; Needle nematodes, *Longidorus elongatus* and other *Longidorus* species; Lesion nematodes, *Pratylenchus brachyurus, Pratylenchus neglectus, Pratylenchus penetrans, Pratylenchus curvitatus, Pratylenchus goodeyi* and other *Pratylenchus* species; Burrowing nematodes, *Radopholus similis* and other *Radopholus* species; Reniform nematodes, *Rotylenchus robustus, Rotylenchus reniformis* and other *Rotylenchus* species; *Scutellonema* species; Stubby root nematodes, *Trichodorus primitivus* and other *Trichodorus* species, *Paratrichodorus* species; Stunt nematodes, *Tylenchorhynchus claytoni, Tylenchorhynchus dubius* and other *Tylenchorhynchus* species; Citrus nematodes, *Tylenchulus* species such as *Tylenchulus semipenetrans*, Dagger nematodes, *Xiphinema* species; and other plant parasitic nematode species.

Examples of further pest species which may be controlled by compounds of formula (I) include: from the class of the Bivalva, for example, *Dreissena* spp.; from the class of the *Gastropoda*, for example, *Arion* spp., *Biomphalaria* spp., *Bulinus* spp., *Deroceras* spp., *Galba* spp., Lymnaea spp., *Oncomelania* spp., *Succinea* spp.; from the class of the helminths, for example, *Ancylostoma duodenale, Ancylostoma ceylanicum, Acylostoma braziliensis, Ancylostoma* spp., *Ascaris lumbricoides, Ascaris* spp., *Brugia malayi, Brugia timori, Bunostomum* spp., *Chabertia* spp., *Clonorchis* spp., *Cooperia* spp., *Dicrocoelium* spp., *Dictyocaulus filaria, Diphyllobothrium latum, Dracunculus medinensis, Echinococcus granulosus, Echinococcus multilocularis, Enterobius vermicularis, Faciola* spp., *Haemonchus* spp. such as *Haemonchus contortus; Heterakis* spp., *Hymenolepis nana, Hyostrongulus* spp., *Loa Loa, Nematodirus* spp., *Oesophagostomum* spp., *Opisthorchis* spp., *Onchocerca volvulus, Ostertagia* spp., *Paragonimus* spp., *Schistosomen* spp., *Strongyloides fuelleborni, Strongyloides stercora lis, Stronyloides* spp., *Taenia saginata, Taenia solium, Trichinella spiralis, Trichinella nativa, Trichinella britovi, Trichinella nelsoni, Trichinella pseudopsiralis, Trichostrongulus* spp., *Trichuris trichiura, Wuchereria bancrofti*; from the order of the *Isopoda*, for example, *Armadillidium vulgare, Oniscus asellus, Porcellio scaber*; from the order of the *Symphyla*, for example, *Scutigerella immaculata*.

Further examples of pest species which may be controlled by compounds of formula (I) include: *Anisoplia austriaca, Apamea* spp., *Austroasca viridignsea, Baliothrips biformis, Caenorhabditis elegans, Cephus* spp., *Ceutorhynchus napi, Chaetocnema aridula, Chilo auricilius, Chilo indicus, Chilo polychrysus, Chortiocetes terminifera, Cnaphalocroci medinalis, Cnaphalocrosis* spp., *Colias eurytheme, Collops* spp., *Cornitermes cumulans, Creontiades* spp., *Cyclocephala* spp., *Dalbulus maidis, Deraceras reticulatum, Diatrea saccharalis, Dichelops furcatus, Dicladispa armigera, Diloboderus* spp. such as *Diloboderus abderus; Edessa* spp., *Epinotia* spp., *Formicidae, Geocoris* spp., *Globitermes sulfureus, Gryllotalpidae, Halotydeus destructor, Hipnodes bicolor, Hydrellia philippina, Julus* spp., *Laodelphax* spp., *Leptocorsia acuta, Leptocorsia oratorius, Liogenys fuscus, Lucillia* spp., *Lyogenys fuscus, Mahanarva* spp., *Maladera matrida, Marasmia* spp., *Mastotermes* spp., *Mealybugs, Megascelis* ssp, *Metamasius hemipterus, Microtheca* spp., *Mocis latipes, Murgantia* spp., *Mythemina separata, Neocapritermes opacus, Neocapritermes parvus, Neomegalotomus* spp., *Neotermes* spp., *Nymphula depunctalis, Oebalus pugnax, Orseolia* spp. such as *Orseolia oryzae; Oxycaraenus hyalinipennis, Plusia* spp., *Pomacea canaliculata, Procornitermes* ssp, *Procornitermes triacifer, Psylloides* spp., *Rachiplusia* spp., *Rhodopholus* spp., *Scaptocoris castanea, Scaptocoris* spp., *Scirpophaga* spp. such as *Scirpophaga incertulas, Scirpophaga innotata; Scotinophara* spp. such as *Scotinophara coarctata; Sesamia* spp. such as *Sesamia inferens, Sogaella frucifera, Solenapsis geminata, Spissistllus* spp., *Stalk borer, Stenchaetothros biformis, Steneotarsonemus spinki, Sylepta derogata, Teiehin licus, Trichostrongylus* spp.

If the formulation according to the invention contain a organic insecticide compound which is active against rice pathogens, the composition may also be used to combat rice phatogens, such as rice water weevil (*Lissorhoptrus oryzaphilus*), rice stem borer (*Chilo suppresalis*), rice leaf roller, rice leaf beetle, rice leaf miner (*Agromyca oryzae*), leafhoppers (*Nephotettix* spp.; especially smaller brown leafhopper, green rice leafhopper), planthoppers (Delphacidae; especially white backed planthopper, brown rice planthopper), stinkbugs.

The formulation according to the invention can be applied in conventional manner, usually as an aqueous dilution which is obtained by diluting the microemulsions with water. The required application rate of the pure active compounds without formulation auxiliary depends on the density of the harmful infestation, on the development stage of the plants, on the climatic conditions of the location where the composition is used and on the application method. In general, the application rate is from 0.001 to 3 kg/ha, preferably from 0.005 to 2 kg/ha and in particular from 0.01 to 1 kg/ha, from 0.1 g/ha to 1 kg/ha, from 1 g/ha to 500 g/ha or from 5 g/ha to 500 g/ha of active substance.

The diluted formulations are applied to plants mainly by spraying, in particular foliar spraying. Application can be carried out by customary spraying techniques using, for example, water as carrier and spray liquor rates of from about 100 to 1000 I/ha (for example from 300 to 400 I/ha).

Moreover, it may be useful to apply the formulations according to the invention jointly as a mixture with other crop protection products, for example with pesticides or agents for controlling phytopathogenic fungi or bacteria. Also of interest is the miscibility with mineral salt solutions which are employed for treating nutritional and trace element deficiencies. Non-phytotoxic oils and oil concentrates may also be added.

The formulations of the present invention are particularly useful for the protection of plant propagation material from insect pests, in particular from soil living insect pests and the resulting plant's roots and shoots against soil pests and foliar insects.

The present invention relates to a method for the protection of plant propagation material, i.e. seeds, from insects, in particular from soil insects and of the seedling's roots and shoots from insects, in particular from soil and foliar insects, said method comprising contacting the seeds before sowing and/or after pregermination with a formulation of the present invention. Particularly preferred is a method, wherein the plant's roots and shoots are protected, more preferably a method, wherein the plants shoots are protected form piercing and sucking insects, most preferably a method, wherein the plants shoots are protected from aphids.

The term "seed" includes seeds and plant propagules of all kinds including, but not limited to true seeds, seed pieces, suckers, corms, bulbs, fruit, tubers, grains, cuttings, cut shoots and the like and means in a preferred embodiment true seeds. The term "seed" treatment includes all suitable seed treatment techniques known in the art, such as seed dressing, seed coating, seed dusting, seed soaking and seed pelleting.

The present invention also relates to seeds coated with or containing the formulation of the present invention. The term "coated with and/or containing" generally signifies that the active ingredient is for the most part on the surface of the propagation product at the time of application, although a greater or lesser part of the ingredient may penetrate into the propagation product, depending on the method of application. When the said propagation product is (re)planted, it may absorb the active ingredient. Suitable seed is seed of cereals, root crops, oil crops, vegetables, spices, ornamentals, for example seed of durum and other wheat, barley, oats, rye, maize (fodder maize and sugar maize/sweet and field corn), soybeans, oil crops, crucifers, cotton, sunflowers, bananas, rice, oilseed rape, turnip rape, sugarbeet, fodder beet, eggplants, potatoes, grass, lawn, turf, fodder grass, tomatoes, leeks, pumpkin/squash, cabbage, iceberg lettuce, pepper, cucumbers, melons, *Brassica* species, melons, beans, peas, garlic, onions, carrots, tuberous plants such as potatoes, sugar cane, tobacco, grapes, petunias, geranium/pelargoniums, pansies and impatiens.

In addition, the formulations of the present invention may also be used for the treatment seeds from plants, which tolerate the action of herbicides or fungicides or insecticides owing to breeding, including genetic engineering methods.

The seed treatment application is carried out by spraying the plant propagation material with an effective amount of the formulation before sowing of the plants and before emergence of the plants.

In the treatment of plant propagation material the corresponding formulations are applied by treating the plant propagation material with an effective amount of the formulation. Herein, the application rates of the organic insecticide a) are generally from 0.1 g to 10 kg per 100 kg of pant propagation material, preferably from 1 g to 5 kg per 100 kg of pant propagation material, in particular from 1 g to 2.5 kg per 100 kg of pant propagation material. For specific crops such as lettuce and onions the rates can be higher.

The invention further relates to the use of the formulations according to the invention for the protection of non-living organic materials against non-crop pests such as non-crop pests of the classes Chilopoda and Diplopoda and of the orders Isoptera, Diptera, Blattaria (Blattodea), Dermaptera, Hemiptera, Hymenoptera, Orthoptera, Siphonaptera, Thysanura, Phthiraptera, Araneida, Parasitiformes and Acaridida and wood damaging fungi.

The present invention also relates to a method for the protection of non-living organic materials against non-crop pests as mentioned above comprising contacting the pests or their food supply, habitat, breeding grounds, their locus or the non-living organic materials themselves with a pesticidally effective amount of a formulation according to the invention.

Furthermore, a formulation according to the invention, which contains an insecticidallyl active compound, can be used for protecting cellulose-containing non-living organic materials, e.g. for protecting cellulose-containing non-living organic materials against non-crop pests from the Isoptera, Diptera, Blattaria (Blattodea), Hymenoptera, and Orthoptera orders, most preferably the Isoptera orders.

The present invention also provides a method for protecting cellulose-containing non-living organic materials against non-crop pests, preferably from the Isoptera, Diptera, Blattaria (Blattodea), Hymenoptera, and Orthoptera orders, most preferably the Isoptera orders, comprising contacting the pests or their food supply, habitat, breeding ground, their locus or the cellulose-containing non-living organic materials themselves with a formulation according to the invention.

Furthermore, the formulations of the present invention which contains an insecticidallyl active compound can be used for protection of animals against non-crop pest of the class Chilopoda and of the orders Araneida, Hemiptera, Diptera, Phthiraptera, Siphonaptera, Parasitiformes and Acaridida by treatment of the pests in water bodies and/or in and around buildings, including but not limited to walls, ground, manure piles, turf grass, pastures, sewers and materials used in the construction of buildings and also mosquito nets, mattresses and bedding, with a formulation according to the present invention.

Animals include warm-blooded animals, including humans and fish. Thus, a formulation according to the invention comprising at least an insecticide can be used for protection of warm-blooded animals, such as cattle, sheep, swine, camels, deer, horses, poultry, rabbits, goats, dogs and cats.

Furthermore, a formulation according to the invention which contains an insecticidallyl active compound can be used for protecting wooden materials, such as trees, board fences, sleepers, etc. and buildings, such as houses, outhouses, factories, but also construction materials, furniture, leathers, fibers, vinyl articles, electric wires and cables etc. from ants and/or termites, and for controlling ants and termites from doing harm to crops or human being (e.g. when the pests invade into houses and public facilities). A formulation according to the invention, comprising at least an insecticide can be applied not only to the surrounding soil surface or into the under-floor soil in order to protect wooden materials, but it can also be applied to lumbered articles, such as surfaces of the under-floor concrete, alcove posts, beams, plywoods, furniture, etc., wooden articles, such as particle boards, half boards, etc. and vinyl articles, such as coated electric wires, vinyl sheets, heat insulating material, such as styrene foams, etc.

Furthermore, a formulation according to the invention can be applied preventively to places at which occurrence of the pests is expected.

The following examples shall further illustrate the present invention. The scope of this invention should not be deemed limited by the examples, but encompasses the entire subject matter defined in the claims. In the examples, all percentage is percent by weight of the total composition.

I Analytics:

Particle sizes can be determined by dynamic light scattering, e.g. with a Zetasizer Nano ZS from Malvern Instruments, a Nanotrac from Particle Metrix GmbH or a Nanofox from Sympatec. Generally, particle sizes are determined on diluted formulations (in water) at 25° C.

Viscosities were determined by means of a rotational viscosimeter at 20° C. in accordance with DIN 51398-01: 1998.

The pH of the formulations was determined by means of a pH meter in accordance with CIPAC MT 75.3.

II Ingredients:

Hyperbranched Polymer HYP1: hyperbranched polycarbonate based on diethyl carbonate and the reaction product of trimethylolpropane with a 15.7 molar excess of propylene oxide, functionalized with PEG chains (degree of functionalization 100%).

a) Hyperbranched polycarbonate core with terminal hydroxyl groups 2298 g of the reaction product of trimethylolpropane with 15.7 mol propylene oxide, 284 g of diethyl carbonate and 2 g of dibutyl tin laurate (DBTL) catalyst were initially charged and heated to boiling. The boiling reaction mixture was stirred (approx. 14 h) until the boiling temperature of the reaction mixture had fallen as a result of the evaporative cooling of the ethanol released to a constant temperature of approx. 143° C. The reflux condenser was then replaced by a distillation apparatus and the ethanol formed in the reaction was distilled off, in the course of which the temperature of the reaction mixture was increased to 230° C. The ethanol was collected in a cooled round bottomed flask and weighed, and the conversion was thus determined as a percentage relative to the theoretically possible full conversion. After the attainment of a conversion of 89%, dry nitrogen was passed through the reaction mixture at a temperature of 160° C. for 1 hour, in order to remove residual amounts of monomers still present. Thereafter, the mixture was cooled to room temperature.

The polymer formed ($M_n$=2400 g/mol; $M_w$=4600 g/mol; OH number: 87 mg KOH/g of polymer) was obtained in the form of a yellow, highly viscous liquid which was not water-soluble.

b) Hyperbranched polycarbonate core, functionalized with Polyethylene glycol chains chains (degree of functionalization 100%)

b.1) 123.5 g of polyethylene glycol monomethyl ether (Mn=500 g/mol) were initially charged and freed of water residues at 80° C. under reduced pressure. After cooling to room temperature, the mixture was placed under nitrogen and the polymer was dissolved in 123.5 g of butyl acetate. 50.0 g of isophorone diisocyanate were then added and the mixture was heated to 50° C. Addition of 19 mg of zinc neodecanoate dissolved in 1 ml of butyl acetate started the reaction which was conducted at 50° C. over the course of 3.5 h down to an NCO content of 2.87%. Subsequently, the reaction was ended by cooling to −20° C. The reaction product was used directly in the following stage b.2 without further workup.

b.2) 30.1 g of the hydrophobic hyperbranched polycarbonate core from stage a) was initially charged and admixed under nitrogen with 71.0 g of the reaction mixture of step b.1. The mixture was then heated to 80° C. and the reaction was started by adding 7 mg of DBTL dissolved in 1 ml of butyl acetate. After the complete conversion of all NCO groups (NCO content 0%), the mixture was cooled and the solvent was removed under reduced pressure.

Finally, the hyperbranched polymer (Mn=5070 g/mol) was obtained in the form of a yellow, highly viscous liquid which was completely water-soluble.

Other Ingredients:

Active 1: Fipronil, 93.1% purity
Active 2: Pyraclostrobin, >95% purity
Active 3: alpha-cypermethrin, >95% purity Solvents LM1:

| LM1.1 | n-propyl lactate |
|---|---|

Solvents LM2:

| LM2.1 | 2-ethylhexyl lactate |
|---|---|

Solvents LM3:

| LM3.1 | N-octyl pyrrolidone |
|---|---|

Solvents LM4:

| LM4.1 | propylene glycol (predominately 1,2-propanol) |
|---|---|

Surfactants:

| Surfactant 1 | Ethoxylate of a iso C13 oxoalcohol, 5 EO*; |
|---|---|
| Surfactant 2 | Ethoxylate of a iso C13 oxoalcohol, 10 EO*; |
| Surfactant 3 | Ethoxylate of a iso C13 oxoalcohol, 7 EO*; |
| Surfactant 4 | Ammonium Salt of a poly(oxyethylene) tristyrylphenyl ether sulfate; |
| Surfactant 5 | Poly(oxyethylene) tristyrylphenyl ether, HLB 14.4. |

*EO ethyleneoxide repeating units

III. Preparation of the Formulations of the Invention:

Examples 1-9 (General Procedure)

i) Solvents as given in table 1, except from solvent LM 4.1 were charged into a vessel equipped with a stirrer. Then the active ingredient or active ingredient mixture was added and the mixture was stirred until it was homogeneous. Then the surfactant was added and the mixture was again stirred until a homogeneous non-aqueous solution was obtained.

ii) In a separate vessel the biocide were dissolved in the required amount of water. Then, solvent LM 4.1 and the hyperbranched polymer, if required, were added and the mixture was stirred until a homogeneous aqueous solution was obtained.

iii) The non-aqueous solution of step i) and the aqueous solution of step ii) were mixed with gentle agitation. Thereby a clear and uniform liquid formulation was obtained.

The thus obtained formulations are clear and uniform liquids. The formulations have a viscosity (Brookfield, 20° C., 100 s$^{-1}$) of 200-300 mPa·s. The pHs of the neat formulations are given in table 2. The density of the formulation (20° C.) is about 1.004-1.042 g/L.

The formulations can be easily diluted with water (Cipac D water) thereby forming opaque to turbid dilutions. The pHs of the 1% aqueous dilutions (deionised water) are about pH 4.0-4.2.

Samples were of formulation 1 were stored for 14 days at 54° C. The visual appearance, the active ingredient content and the pH of the neat formulation and of the formulation after dilution were then determined. The results are summarized in table 2. The results indicate that the formulation 1 was perfectly stable.

TABLE 1

Formulation Examples 1 to 10

| Ingredient* | Formulation | | | | | | | | |
|---|---|---|---|---|---|---|---|---|---|
| | 1 | 2 | 3 | 4 | 5 | 6 | 7 | 8 | 9 |
| Active 1 | 50 | 50 | 50 | 50 | 50 | 50 | 50 | 98 | 98 |
| Active 2 | 0 | 0 | 0 | 0 | 0 | 0 | 0 | 60 | 60 |
| HY1 | 96 | 0 | 0 | 0 | 0 | 0 | 0 | 150 | 150 |
| LM1.1 | 112 | 112 | 112 | 112 | 112 | 112 | 112 | 95 | 85 |
| LM2.1 | 50 | 50 | 50 | 50 | 50 | 50 | 50 | 50 | 50 |
| LM3.1 | 162 | 162 | 162 | 162 | 162 | 162 | 162 | 205 | 155 |
| LM4.1 | 130 | 156 | 176 | 156 | 176 | 156 | 176 | 0 | 75 |
| Surfactant 1 | 44 | 44 | 40 | 48 | 44 | 40 | 36 | 0 | 0 |
| Surfactant 2 | 88 | 88 | 80 | 96 | 88 | 80 | 72 | 0 | 0 |
| Surfactant 3 | 0 | 0 | 0 | 0 | 0 | 0 | 0 | 40 | 35 |
| Surfactant 4 | 88 | 88 | 80 | 96 | 88 | 80 | 72 | 0 | 140 |
| Surfactant 5 | 0 | 0 | 0 | 0 | 0 | 0 | 0 | 150 | 0 |
| Biocide | 2 | 2 | 2 | 2 | 2 | 2 | 2 | 2 | 2 |
| Water | 178 | 248 | 248 | 228 | 228 | 268 | 268 | 149 | 149 |

*Amounts of ingredients are given in "g"

TABLE 2

Properties of Formulation Example 1

| Formulation | 1 |
|---|---|
| pH neat (0) [1] | 4.4 |
| pH neat (14 d) [2] | 3.9 |
| pH 1% (0) [3] | 4.1 |
| pH 1% (14 d) [4] | 3.7 |
| Appearance (0) [5] | + |
| Appearance (14 d) [6] | + |
| AI (0) [g/L] [7] | 47.6 |
| AI (14 d) [g/L] [8] | 47.7 |

[1] pH of the neat formulation, directly after its preparation
[2] pH of the neat formulation after 2 weeks storage at 54° C.
[3] pH of the 1% aqueous dilution of the formulation, directly after its preparation
[4] pH of the 1% aqueous dilution of the formulation, after 2 weeks storage at 54° C.
[5] visual appearance of the neat formulation, directly after its preparation (+ indicates optically cleaer formulation)
[6] visual appearance of the neat formulation after 2 weeks storage at 54° C.
[7] Concentration of Fipronil, directly after preparation
[8] Concentration of Fipronil after 2 weeks storage at 54° C.

Biological Test: Control of Eastern Subterranean Termite *Reticulitermes flavipes*

Bioassays were conducted in 60×15 mm Petri dishes with a 1% agar layer for moisture and 20 termite workers per dish. Three replicates were made. Mean % mortality was thus based on 60 termites (20 termites per replicate).

Bioassay:

1 part of the formulation was diluted with 75 parts of water. The dilutions were incorporated into sandy loam soil by hand by adding the diluted formulation to the soil and shaking the mixture with use of a commercial jar roller. The soil was allowed to sit at overnight. The soil was then air dried for 24 hours prior to introduction into the test dishes. 2 gr of soil were placed in a Petri dish. A 1 cm×1 cm piece of moist filter paper was used as a food source. Conventional suspension concentrate of fipronil was used as a standard S1, and untreated soil used as a control C1. Test dishes were maintained at approximately 26° C. and 85% RH. 20 termite workers were placed in the dishes and the dishes were observed daily for 13 days for mortality. The concentration of active ingredient in the soil was 0.5 ppm, 0.75 ppm and 1 ppm, respectively. The results are summarized in table 3. The following rating was used −<20% mortality
o 20-<50% mortality
+50-<70% mortality
++70-100% mortality

TABLE 3

| Formulation | 1 | C1[1] | C2[2] | C3[3] |
|---|---|---|---|---|
| DAE1 [4] | | | | |
| 0.5 ppm | + | − | − | − |
| 0.75 ppm | ++ | − | o | |
| 1.0 ppm | ++ | o | o | |
| DAE2 [4] | | | | |
| 0.5 ppm | ++ | + | + | − |
| 0.75 ppm | ++ | + | + | |
| 1.0 ppm | ++ | ++ | + | |

[1] C1 = Comparative 1: Conventional suspension concentrate of Fipronil
[2] C2 = Comparative 2: Mixture of the conventional suspension concentrate of Fipronil with hyperbranched polymer HYP1 in a weight ratio of 1:1
[3] Application of water (Control)
[4] DAE: Days after Exposure

We claim:

1. An aqueous pesticide microemulsion formulation consisting of:
   a) at least one organic pesticide compound P, wherein the organic pesticide compound P has a solubility of at most 1 g/L in deionized water at 20° C. and 1 bar and is present in the formulation in dissolved form;
   b) at least one organic solvent LM1, wherein the organic solvent LM1 is a $C_1$-$C_4$-alkyl lactate;
   c) at least one organic solvent LM2, wherein the organic solvent LM2 is a $C_5$-$C_{12}$-alkyl lactate;
   d) at least one organic solvent LM3, wherein the organic solvent LM3 is a N—($C_4$-$C_{12}$-alkyl)pyrrolidone;
   e) at least one surfactant S selected from the group consisting of anionic surfactants, non-ionic surfactants, and mixtures thereof; and
   f) water,
   wherein the pesticide compound is selected from the group consisting of 1-phenylpyrazole insecticide compounds, pyrethroid compounds, triazole fungicides, anilide fungicides and mixtures thereof, and wherein the mass ratio of the solvent LM1 to the solvent LM2 is from 20:1 to 1:5.

2. The formulation of claim 1, wherein the organic solvent LM1 is selected from the group consisting of ethyl lactate, n-propyl lactate, isopropyl lactate, and mixtures thereof.

3. The formulation of claim 1, wherein the solvent LM2 is 2-ethylhexyl lactate.

4. The formulation of claim 1, wherein the solvent LM3 is selected from the group consisting of 1-(n-hexyl)-2-pyrrolidone, 1-(n-octyl)-2-pyrrolidone, 1-(2-ethylhexyl)-2-pyrrolidone, and 1-dodecyl-2-pyrrolidone.

5. The formulation of claim 1, wherein the at least one surfactant comprises at least one non-ionic surfactant.

6. The formulation of claim 5, wherein the non-ionic surfactant is selected from the group consisting of homo- or copolymers of $C_2$-$C_3$-alkylene oxides, poly(oxy-$C_2$-$C_3$-alkylene) $C_8$-$C_{22}$-alkyl ethers, poly(oxy-$C_2$-$C_3$-alkylene) $C_1$-$C_{16}$-alkylbenzene ethers, poly(oxy-$C_2$-$C_3$-alkylene) mono-, di- or tristyryl phenyl ethers, poly(oxy-$C_2$-$C_3$-alkylene) mono- or distyryl phenyl ether-formaldehyde condensates, and mixtures thereof.

7. The formulation of claim 1, wherein the anionic surfactant is selected from the group consisting of the salts of $C_1$-$C_{16}$-alkyl benzene sulfonates, $C_1$-$C_{16}$-alkyl naphthalene sulfonates, lignosulfonates, naphthalene sulfonate-formaldehyde condensates, $C_1$-$C_{16}$-alkyl naphthalene sulfonate-formaldehyde condensates, polyoxy-$C_2$-$C_3$-alkylene $C_8$-$C_{22}$-alkyl ether sulfates, polyoxy-$C_2$-$C_3$-alkylene $C_8$-$C_{22}$-alkyl ether phosphates, polyoxy-$C_2$-$C_3$-alkylene $C_1$-$C_{16}$-alkylbenzene ether sulfates, polyoxy-$C_2$-$C_3$-alkylene $C_1$-$C_{16}$-alkylbenzene ether phosphates, $C_8$-$C_{22}$-alkyl sulfates, $C_4$-$C_{18}$-dialkyl sulfosuccinates, polyoxy-$C_2$-$C_3$-alkylene mono-, di- or tristyryl phenyl ether sulfates, polyoxy-$C_2$-$C_3$-alkylene mono-, di- or tristyryl phenyl ether phosphates, polyoxyethylene polycarboxylates, and mixtures thereof.

8. The formulation of claim 1, wherein the surfactant comprises at least one first non-ionic surfactant and at least one second surfactant, wherein the first non-ionic surfactant is a poly(oxy-$C_2$-$C_3$-alkylene) $C_8$-$C_{22}$-alkyl ether and wherein the at least one second surfactant is selected from the group consisting of polyoxy-$C_2$-$C_3$-alkylene mono-, di- or tristyryl phenyl ethers and the salts of polyoxy-$C_2$-$C_3$-alkylene mono-, di- or tristyryl phenyl ether sulfates.

9. The formulation of claim 1, wherein the pesticide compound comprises a 1-phenylpyrazole insecticide compound.

10. The formulation of claim 9, wherein the pesticide compound comprises fipronil.

11. The formulation of claim 1, consisting of:
a) from 1 to 30% by weight of the at least one pesticide compound P;
b) from 3 to 30% by weight of at least one solvent LM1;
c) from 1 to 20% by weight of at least one solvent LM2;
c) from 10 to 50% by weight of at least one solvent LM3;
d) from 5 to 30% by weight of the at least one surfactant; and
e) from 5 to 50% by weight of water;
wherein each amount given in % by weight is based on the weight of the formulation.

12. A formulation for at least one of combating plant damaging pests, for plant protection or seed protection and for protection of non-living material against attack or infestation by plant damaging pests, the formulation consisting of the aqueous pesticide microemulsion formulation of claim 1.

13. A method of preparing an aqueous microemulsion formulation of an organic pesticide compound having a solubility of at most 1 g/L in deionized water at 20° C. and 1 bar, the method comprising:
preparing a mixture of organic solvents comprising:
at least one organic solvent LM1, wherein the organic solvent LM1 is a $C_2$-$C_4$-alkyl lactate;
at least one organic solvent LM2, wherein the organic solvent LM2 is a $C_5$-$C_{12}$-alkyl lactate; and
at least one organic solvent LM3, wherein the organic solvent LM3 is a N—($C_4$-$C_{12}$-alkyl)pyrrolidones;
adding the organic pesticide to the mixture of organic solvents and stirring until the solution is homogeneous,
adding a surfactant to the solution comprising the organic pesticide and the mixture of organic solvents and stirring until the solution is homogeneous, thereby preparing a homogeneous non-aqueous solution, wherein the surfactant is selected from the group consisting of anionic surfactants, non-ionic surfactants, and mixtures thereof; and
mixing the homogeneous non-aqueous solution with an aqueous solution comprising water, and agitating the combined solutions, thereby making the aqueous microemulsion formulation,
wherein the mass ratio of the solvent LM1 to the solvent LM2 is from 20:1 to 1:5;
wherein the pesticide compound is selected from the group consisting of 1-phenylpyrazole insecticide compounds, pyrethroid compounds, triazole fungicides, anilide fungicides and mixtures thereof; and
wherein the formulation consists of the organic pesticide, LM1, LM2, LM3, the surfactant, and water.

* * * * *